(12) United States Patent
Miyata

(10) Patent No.: US 10,823,108 B1
(45) Date of Patent: Nov. 3, 2020

(54) INTERNAL COMBUSTION ENGINE, STRADDLED VEHICLE, AND METHOD FOR MANUFACTURING INTERNAL COMBUSTION ENGINE

(71) Applicant: YAMAHA HATSUDOKI KABUSHIKI KAISHA, Iwata (JP)

(72) Inventor: Manabu Miyata, Iwata (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 16/775,459

(22) Filed: Jan. 29, 2020

(30) Foreign Application Priority Data

Apr. 12, 2019 (JP) ................. 2019-076319

(51) Int. Cl.
| | | |
|---|---|---|
| *F01M 9/10* | (2006.01) | |
| *F02F 1/42* | (2006.01) | |
| *F01L 1/047* | (2006.01) | |
| *F01L 1/46* | (2006.01) | |
| *F01L 1/12* | (2006.01) | |
| *B33Y 80/00* | (2015.01) | |
| *F01M 11/02* | (2006.01) | |
| *F16J 10/02* | (2006.01) | |
| *B22D 25/02* | (2006.01) | |
| *B22C 9/10* | (2006.01) | |
| *B62K 11/04* | (2006.01) | |

(52) U.S. Cl.
CPC .............. *F02F 1/4214* (2013.01); *B22C 9/10* (2013.01); *B22D 25/02* (2013.01); *B33Y 80/00* (2014.12); *B62K 11/04* (2013.01); *F01L 1/047* (2013.01); *F01L 1/12* (2013.01); *F01L 1/462* (2013.01); *F01M 9/10* (2013.01); *F01M 11/02* (2013.01); *F16J 10/02* (2013.01)

(58) Field of Classification Search
CPC ......... F02F 1/4214; F16J 10/02; F01M 11/02; F01M 9/10; F01L 1/12; F01L 1/047; F01L 1/462; B22C 9/10; B22D 25/02; B62K 11/04; B33Y 80/00
See application file for complete search history.

(56) References Cited

U.S. PATENT DOCUMENTS 5,931,125 A * 8/1999 Valasopoulos .......... F01L 1/143
123/90.16

FOREIGN PATENT DOCUMENTS

| JP | H05306609 A | 11/1993 |
| JP | H08226315 A | 9/1996 |

* cited by examiner

*Primary Examiner* — Zelalem Eshete
(74) *Attorney, Agent, or Firm* — Rabin & Berdo, P.C.

(57) ABSTRACT

An internal combustion engine includes a cylinder head including a first valve lifter hole, a first camshaft rotatably supported on the cylinder head, a first valve lifter inserted in the first valve lifter hole, a first valve spring that biases the first valve lifter toward the first cam of the first camshaft, and an oil supply passage having a first oil supply port formed on the inner circumferential surface of the first valve lifter hole and a first passage connected to the first oil supply port. An upper end of the first oil supply port is located upward relative to the upper surface of the first valve lifter when the first valve lifter is in the lower position. A lower end of the first oil supply port is located downward relative to the upper surface of the first valve lifter when the first valve lifter is in the upper position.

12 Claims, 11 Drawing Sheets

INTERNAL COMBUSTION ENGINE, STRADDLED VEHICLE, AND METHOD FOR MANUFACTURING INTERNAL COMBUSTION ENGINE

CROSS-REFERENCE TO RELATED APPLICATIONS

This application claims the benefit of priority to Japanese Patent Application No. 2019-076319 filed on Apr. 12, 2019, the entire contents of which are hereby incorporated herein by reference.

BACKGROUND OF THE INVENTION

Field of the Invention

The present invention relates to an internal combustion engine, a straddled vehicle, and a method for manufacturing an internal combustion engine.

Description of the Related Art

Conventional internal combustion engines that open/close valves by means of rotating cams are known in the art. Valves are movable parts. In order to prevent the wear and seizure of valves, there is a need to appropriately supply lubricant oil to sliding surfaces of the valves.

Japanese Laid-Open Patent Publication No. H05-306609 discloses an internal combustion engine that includes three intake valves actuated by a direct-type valve mechanism or a swing arm-type valve mechanism and includes openings for supplying oil onto the inner circumferential surface of the valve lifter holes of the intake valves. Each opening is connected to a single oil passage. With this internal combustion engine, lubricant oil can be directly supplied, through the oil passage, between the inner circumferential surface of the valve lifter hole and the outer circumferential surface of the valve lifter.

Japanese Laid-Open Patent Publication No. H08-226315 discloses an internal combustion engine that includes a reflector wall for supplying lubricant oil toward the sliding surface between the cam and the cam slipper, and a lubricant oil supply pipe having a spray hole for spraying lubricant oil toward the reflector wall. The lubricant oil supply pipe is arranged upward of the cam. The reflector wall is arranged beside the cam so that the sprayed lubricant oil is unlikely to hit the cam. With this internal combustion engine, since the lubricant oil path extending from the spray hole to the sliding surface does not interfere with the area of cam rotation, it is possible to prevent lubricant oil from being spattered by the cam.

As described above, with the internal combustion engine disclosed in Japanese Laid-Open Patent Publication No. H05-306609, it is possible to directly supply lubricant oil between the inner circumferential surface of the valve lifter hole and the outer circumferential surface of the valve lifter. The valve lifter hole serves to guide the valve lifter so that the valve lifter does not incline from the valve center line when the valve lifter reciprocates. The gap between the inner circumferential surface of the valve lifter hole and the outer circumferential surface of the valve lifter is designed to be very small so that the valve lifter reciprocates straight in the valve lifter hole. Therefore, lubricant oil in the oil passage is unlikely to flow toward between the inner circumferential surface of the valve lifter hole and the outer circumferential surface of the valve lifter. In order to stably supply lubricant oil, there is a need for a high-power oil pump.

With the internal combustion engine disclosed in Japanese Laid-Open Patent Publication No. H05-306609, lubricant oil cannot be directly supplied between the cam and the upper surface of the valve lifter. On the other hand, with the internal combustion engine disclosed in Japanese Laid-Open Patent Publication No. H08-226315, lubricant oil can be directly supplied to the sliding surface of the cam. Thus, one may consider supplying lubricant oil between the cam and the upper surface of the valve lifter by adding the lubricant oil supply pipe and the reflector wall disclosed in Japanese Laid-Open Patent Publication No. H08-226315 to the internal combustion engine disclosed in Japanese Laid-Open Patent Publication No. H05-306609.

In that case, however, with the addition of new members, i.e., a lubricant oil supply pipe and a reflector wall, there is a need to ensure a sufficient clearance between the lubricant oil supply pipe and the reflector wall and other members. However, since the internal space of the internal combustion engine is small, the installment of the lubricant oil supply pipe and the reflector wall is likely to entail design restrictions and make it difficult to realize a size reduction. As lubricant oil hits the reflector wall, the speed of the lubricant oil decreases significantly. The lubricant oil whose speed has been decreased drips by gravity so as to be supplied to intended portions. Now, a straddled vehicle may take an inclined attitude. For example, a straddled vehicle may take an inclined attitude, e.g., when banking and wheeling, under particular circumstances such as during a motocross race. When the internal combustion engine described above is installed on a straddled vehicle, the attitude of the internal combustion engine may change. However, when the internal combustion engine is inclined, lubricant oil reflected by the reflector wall may no longer be supplied accurately to the intended portions, making the lubricant oil supply unstable. The internal combustion engine disclosed in Japanese Laid-Open Patent Publication No. H08-226315 includes a swing arm-type valve mechanism. Now, the area of the upper surface of the valve lifter of a direct-type valve mechanism is smaller than the area of the cam slipper (the portion of the swing arm that contacts the cam) of a swing arm-type valve mechanism. When a lubricant oil supply pipe and a reflector wall are provided in an internal combustion engine having a direct-type valve mechanism, there is a need to supply lubricant oil reflected by the reflector wall to a portion of a smaller area (i.e., between the cam and the upper surface of the valve lifter). In view also of changes in the attitude of the internal combustion engine, the lubricant oil supply may be even more unstable.

SUMMARY OF THE INVENTION

An object of the present invention is to provide an internal combustion engine having a direct-type valve mechanism, wherein lubricant oil is stably supplied to a sliding surface of a valve lifter that slides against a valve lifter hole and to a sliding surface of the valve lifter that slides against a cam, while preventing the internal combustion engine from becoming larger.

An internal combustion engine disclosed herein includes a cylinder head, a first camshaft, a first valve lifter, a first valve spring, and an oil supply passage. The cylinder head includes a first valve lifter hole having an inner circumferential surface. The first camshaft has a first cam and is rotatably supported on the cylinder head. The first valve lifter is inserted in the first valve lifter hole and has an outer circumferential surface in contact with the inner circumferential surface of the first valve lifter hole and an upper surface in contact with the first cam. The first valve spring biases the first valve lifter toward the first cam so that the first valve lifter reciprocates, following rotation of the first cam, between a lower position and an upper position that is closer to the first camshaft than the lower position. The oil supply passage has a first oil supply port formed on the inner circumferential surface of the first valve lifter hole and a first passage connected to the first oil supply port. The oil supply passage carries lubricant oil flowing therethrough. An upper end of the first oil supply port is located upward relative to the upper surface of the first valve lifter when the first valve lifter is in the lower position. A lower end of the first oil supply port is located downward relative to the upper surface of the first valve lifter when the first valve lifter is in the upper position.

Note that the term "upward" as used herein refers to the direction in which the valve lifter moves toward the center line of the camshaft, and the term "downward" refers to the direction in which the valve lifter moves away from the center line of the camshaft.

With the internal combustion engine described above, when the first valve lifter is in the lower position, the upper end of the first oil supply port is located upward relative to the upper surface of the first valve lifter. When the first valve lifter reciprocates between the upper position and the lower position, the first oil supply port is at least partially exposed. Therefore, lubricant oil is directly supplied to the upper surface of the first valve lifter from the first passage of the oil supply passage through the first oil supply port. The upper surface of the first valve lifter is a sliding surface that slides against the first cam. With the internal combustion engine described above, it is possible to stably supply lubricant oil to the sliding surface of the first valve lifter that slides against the first cam.

As the first valve lifter ascends, the lubricant oil supplied to the upper surface of the first valve lifter flows over the periphery of the upper surface of the first valve lifter down between the outer circumferential surface of the first valve lifter and the first inner circumferential surface of the valve lifter hole. The outer circumferential surface of the first valve lifter is a sliding surface that slides against the first valve lifter hole. Thus, it is possible to supply lubricant oil to the sliding surface of the first valve lifter that slides against the first valve lifter hole. In addition, with the internal combustion engine described above, when the first valve lifter is in the upper position, the lower end of the first oil supply port is located downward relative to the upper surface of the first valve lifter. When the first valve lifter reciprocates between the upper position and the lower position, the first oil supply port at least partially faces the outer circumferential surface of the first valve lifter. Therefore, lubricant oil is directly supplied to the outer circumferential surface of the first valve lifter from the first passage of the oil supply passage through the first oil supply port. Therefore, it is possible to directly supply lubricant oil to the sliding surface of the first valve lifter that slides against the first valve lifter hole. With the internal combustion engine described above, it is possible to stably supply lubricant oil to the sliding surface of the first valve lifter that slides against the first valve lifter hole.

With the internal combustion engine described above, there is no need for the lubricant oil supply pipe and the reflector wall described above. Therefore, it is possible to prevent the internal combustion engine from becoming larger.

Therefore, with the internal combustion engine described above, it is possible to prevent the internal combustion engine from becoming larger, and it is possible to stably supply lubricant oil to the sliding surface of the first valve lifter that slides against the first valve lifter hole and to the sliding surface of the first valve lifter that slides against the first cam.

According to one preferred aspect, the lower end of the first oil supply port is located upward relative to the upper surface of first valve lifter being in the lower position.

According to this aspect, when the first valve lifter reciprocates between the upper position and the lower position, the first oil supply port is entirely exposed. Therefore, it is possible to directly supply more lubricant oil to the upper surface of the first valve lifter from the first passage of the oil supply passage through the first oil supply port. Therefore, it is possible to stably supply lubricant oil to the sliding surface of the first valve lifter that slides against the first cam.

According to one preferred aspect, as viewed along a center line of the first valve lifter hole, an angle formed between a straight line that connects together a center of the first valve lifter hole and the first oil supply port and a center line of the first camshaft is within 45 degrees.

According to this aspect, the first oil supply port is provided at a position that is relatively far away from the first cam. Therefore, lubricant oil supplied from the first oil supply port is unlikely to be spattered by the first cam. Thus, it is possible to more stably supply lubricant oil to the upper surface of the first valve lifter from the first oil supply port.

Since the first cam rotates about the center line of the first camshaft, the first valve lifter, which receives a force from the first cam, is likely to receive a force in a direction that is perpendicular to the center line of the first camshaft. The pressure that the inner circumferential surface of the first valve lifter hole of the cylinder head receives from the outer circumferential surface of the first valve lifter is greater in portions thereof that are closer to a line that is perpendicular to the center line of the first camshaft. According to this aspect, the first oil supply port is provided at a position that is relatively far away from the line perpendicular to the center line of the first camshaft. Therefore, even though the first oil supply port is formed on the inner circumferential surface of the first valve lifter hole, it is possible to maintain a sufficient mechanical strength of the peripheral portion of the first valve lifter hole.

According to one preferred aspect, the angle is within 10 degrees.

According to one preferred aspect, as viewed along a center line of the first valve lifter hole, a straight line that connects together a center of the first valve lifter hole and a center of the first oil supply port coincides with a center line of the first camshaft.

According to one preferred aspect, a rotation angle range of the first camshaft when the upper surface of the first valve lifter is located downward relative to the upper end of the first oil supply port is 50% or more and less than 100% with respect to a rotation angle range of the first camshaft from when the first valve lifter starts moving from the upper position until the first valve lifter returns to the upper position.

According to this aspect, it is possible to sufficiently supply lubricant oil to the upper surface of the first valve lifter, and it is possible to stably supply lubricant oil to the sliding surface of the first valve lifter that slides against the first cam.

According to one preferred aspect, the first passage of the oil supply passage extends in a direction perpendicular to a center line of the first valve lifter hole.

According to this aspect, the area of the first oil supply port is smaller as compared with a case where the first passage extends in a direction inclined relative to the center line of the first valve lifter hole. Therefore, it is possible to ensure a large area of the inner circumferential surface of the first valve lifter hole. Thus, it is possible to maintain a sufficient mechanical strength of the peripheral portion of the first valve lifter hole of the cylinder head.

According to one preferred aspect, the cylinder head includes a second valve lifter hole having an inner circumferential surface. The first camshaft has a second cam. The internal combustion engine includes a second valve lifter inserted in the second valve lifter hole and having an outer circumferential surface in contact with the inner circumferential surface of the second valve lifter hole and an upper surface in contact with the second cam. The internal combustion engine includes a second valve spring that biases the second valve lifter toward the second cam so that the second valve lifter reciprocates, following rotation of the second cam, between a lower position and an upper position that is closer to the first camshaft than the lower position. The oil supply passage has a second oil supply port formed on the inner circumferential surface of the second valve lifter hole and a second passage connected to the second oil supply port. As viewed along a center line of the first valve lifter hole, the first passage is arranged on the second valve lifter hole side relative to a center of the first valve lifter hole. As viewed along a center line of the second valve lifter hole, the second passage is arranged on the first valve lifter hole side relative to a center of the second valve lifter hole. The oil supply passage includes a first vertical passage that is arranged on the second valve lifter hole side relative to the first valve lifter hole and on the first valve lifter hole side relative to the second valve lifter hole, extends in a direction perpendicular to the first camshaft, and is connected to the first passage and the second passage.

According to this aspect, the first passage and the second passage branch off a single vertical passage. Therefore, it is possible to shorten the overall length of the oil supply passage. Thus, it is possible to prevent a pressure decrease of lubricant oil in the first passage and the second passage. Therefore, it is possible to stably supply lubricant oil to the sliding surface of the first valve lifter that slides against the first valve lifter hole, the sliding surface of the first valve lifter that slides against the first cam, the sliding surface of the second valve lifter that slides against the second valve lifter hole, and the sliding surface of the second valve lifter that slides against the second cam, while preventing the internal combustion engine from becoming larger. The first vertical passage is formed between the first valve lifter hole and the second valve lifter hole, and extends in a direction perpendicular to the first camshaft. This makes it more likely that lubricant oil is evenly supplied to the first oil supply port and the second oil supply port.

According to one preferred aspect, the cylinder head includes third and fourth valve lifter holes each having an inner circumferential surface. The internal combustion engine includes a second camshaft having a third cam and a fourth cam and rotatably supported on the cylinder head. The internal combustion engine includes a third valve lifter inserted in the third valve lifter hole and having an outer circumferential surface in contact with the inner circumferential surface of the third valve lifter hole and an upper surface in contact with the third cam. The internal combustion engine includes a fourth valve lifter inserted in the fourth valve lifter hole and having an outer circumferential surface in contact with the inner circumferential surface of the fourth valve lifter hole and an upper surface in contact with the fourth cam. The internal combustion engine includes a third valve spring that biases the third valve lifter toward the third cam so that the third valve lifter reciprocates, following rotation of the third cam, between a lower position and an upper position that is closer to the second camshaft than the lower position. The internal combustion engine includes a fourth valve spring that biases the fourth valve lifter toward the fourth cam so that the fourth valve lifter reciprocates, following rotation of the fourth cam, between a lower position and an upper position that is closer to the second camshaft than the lower position. The oil supply passage includes a third oil supply port formed on the inner circumferential surface of the third valve lifter hole, a third passage connected to the third oil supply port, a fourth oil supply port formed on the inner circumferential surface of the fourth valve lifter hole, and a fourth passage connected to the fourth oil supply port. As viewed along a center line of the third valve lifter hole, the third passage is arranged on the fourth valve lifter hole side relative to a center of the third valve lifter hole. As viewed along a center line of the fourth valve lifter hole, the fourth passage is arranged on the third valve lifter hole side relative to a center of the fourth valve lifter hole. The oil supply passage includes a second vertical passage that is arranged on the fourth valve lifter hole side relative to the third valve lifter hole and on the third valve lifter hole side relative to the fourth valve lifter hole, extends in a direction perpendicular to the second camshaft, and is connected to the third passage and the fourth passage. The oil supply passage includes an upstream passage that communicates with the first vertical passage and the second vertical passage.

According to this aspect, it is also possible to stably supply lubricant oil to the sliding surface of the third valve lifter that slides against the third valve lifter hole, the sliding surface of the third valve lifter that slides against the third cam, the sliding surface of the fourth valve lifter that slides against the fourth valve lifter hole, and the sliding surface of the fourth valve lifter that slides against the fourth cam.

According to one preferred aspect, a depression that is depressed downward is formed along a peripheral portion of the first valve lifter hole of the cylinder head and downward of the first cam.

According to this aspect, the peripheral portion of the first valve lifter hole can be prevented from interfering with the rotating first cam. Since it is possible to ensure a sufficient height of a portion, other than the depression, of the peripheral portion, it is possible to increase the area of the inner circumferential surface of the first valve lifter hole. Therefore, it is possible to reduce the pressure that the inner circumferential surface of the first valve lifter hole receives from the outer circumferential surface of the first valve lifter, and it is possible to maintain a sufficient mechanical strength of the peripheral portion of the first valve lifter hole.

Now, if an excess of lubricant oil remains on the upper surface of the first valve lifter, it may possibly increase the resistance against the rotation of the first cam. According to this aspect, however, even if lubricant oil remains on the upper surface of the first valve lifter, any excess of lubricant oil is likely to flow over the upper surface via the depression. Thus, it is possible to reduce the resistance against the rotation of the first cam.

According to this aspect, with the provision of the depression, a portion of the outer circumferential surface of the first valve lifter (specifically, a portion that is adjacent to the depression) does not come into contact with the inner circumferential surface of the first valve lifter hole when the first valve lifter is in the upper position. Lubricant oil is temporarily not supplied to said portion. However, since lubricant oil is directly supplied to the sliding surface of the first valve lifter that slides against the first valve lifter hole from the oil supply passage, lubricant oil is sufficiently supplied to said portion while the first valve lifter moves from the upper position toward the lower position. When the first valve lifter comes back from the lower position to the upper position, lubricant oil that has remained on the upper surface of the first valve lifter is supplied to the lubricating surface. Therefore, it is possible to also well lubricate said portion of the outer circumferential surface of the first valve lifter (i.e., a portion that is adjacent to the depression when the first valve lifter is in the upper position). Despite the provision of the depression, it is possible to desirably supply lubricant oil to the sliding surface of the first valve lifter that slides against the first valve lifter hole.

A straddled vehicle disclosed herein includes the internal combustion engine set forth above.

A method for manufacturing the internal combustion engine disclosed herein includes: producing a core having the same shape as the oil supply passage by using a three-dimensional modeling device; and casting the cylinder head with the core fitted in a cast.

With the method described above, it is possible to form the oil supply passage without performing a drilling process. Even an oil supply passage having a complicated shape can be manufactured with ease and high precision.

The present invention provides an internal combustion engine having a direct-type valve mechanism, wherein lubricant oil is stably supplied to a sliding surface of a valve lifter that slides against a valve lifter hole and to a sliding surface of the valve lifter that slides against a cam, while preventing the internal combustion engine from becoming larger.

DETAILED DESCRIPTION OF THE PREFERRED EMBODIMENTS

Figure 1:
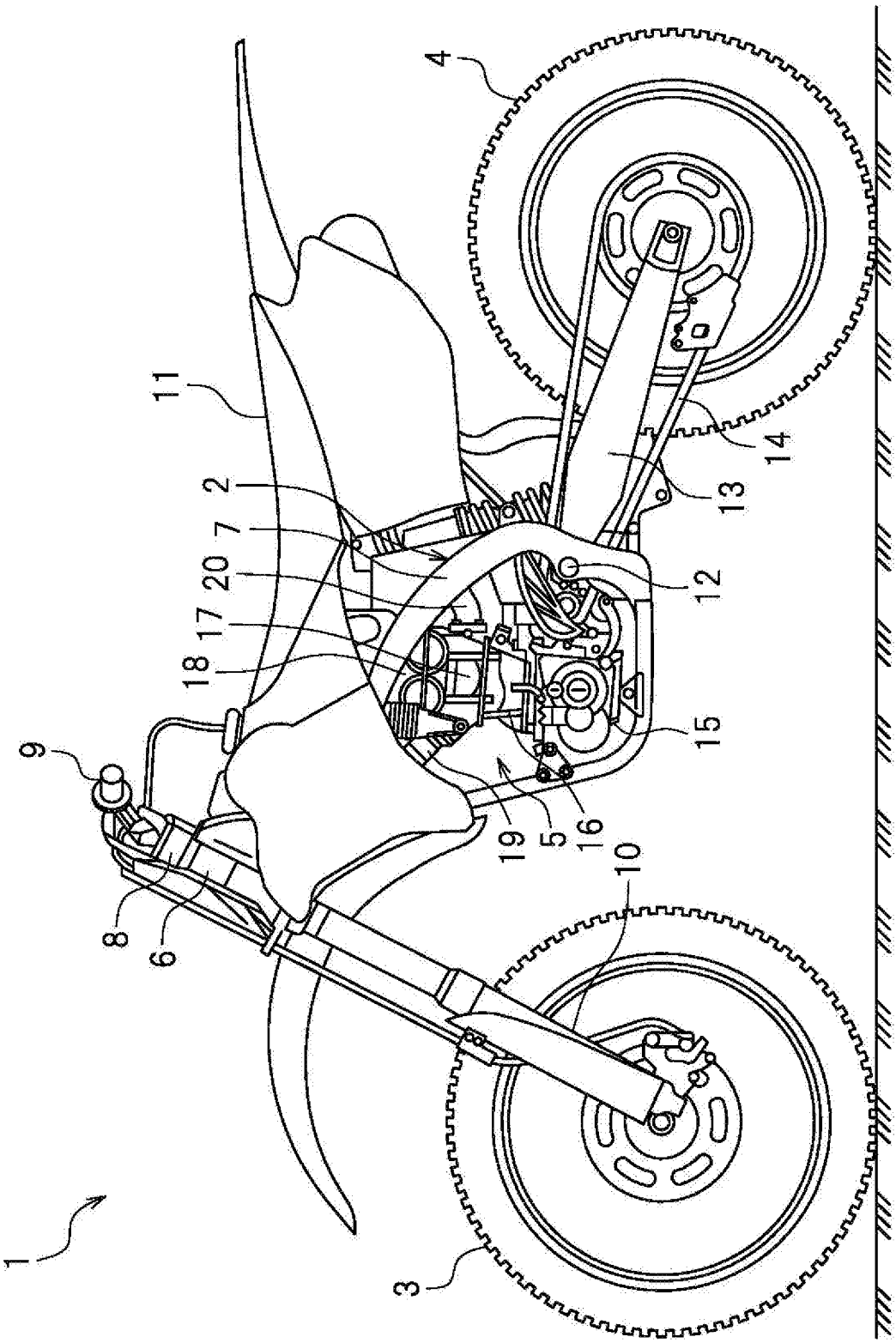
FIG. 1 is a side view of a motorcycle according to an embodiment.

An embodiment will now be described with reference to the drawings. A motorcycle 1 shown in FIG. 1 will be described below as an example of the straddled vehicle.

The motorcycle 1 includes a body frame 2, an internal combustion engine (hereinafter referred to as an engine) 5 supported on the body frame 2, a seat 11 supported on the body frame 2, a front wheel 3, and a rear wheel 4. The body frame 2 includes a head pipe 6, and a main frame 7 extending rearward from the head pipe 6. The engine 5 is supported on the main frame 7. The head pipe 6 supports a steering shaft 8 so that the steering shaft 8 can rotate left and right. A handle 9 is secured on an upper portion of the steering shaft 8. A front fork 10 is provided on a lower portion of the steering shaft 8. The front wheel 3 is rotatably supported on the front fork 10. A pivot shaft 12 is provided on the main frame 7. A front end portion of a rear arm 13 is pivotally connected to the pivot shaft 12. The rear wheel 4 is supported on the rear end portion of the rear arm 13. The rear wheel 4 and the engine 5 are linked together by a chain 14, which is an example of the power transmission member.

The engine 5 includes a crank case 15 accommodating a crank shaft (not shown) therein, a cylinder body 16 connected to the crank case 15, a cylinder head 17 connected to the cylinder body 16, and a cylinder head cover 18 connected to the cylinder head 17. A cylinder 16a (see FIG. 2) is provided inside the cylinder body 16. A piston (not shown) is arranged in the cylinder 16a. The piston and the crank shaft are linked together by a connecting rod (not shown). An intake pipe 19 and an exhaust pipe 20 are connected to the cylinder head 17.

Figure 2:
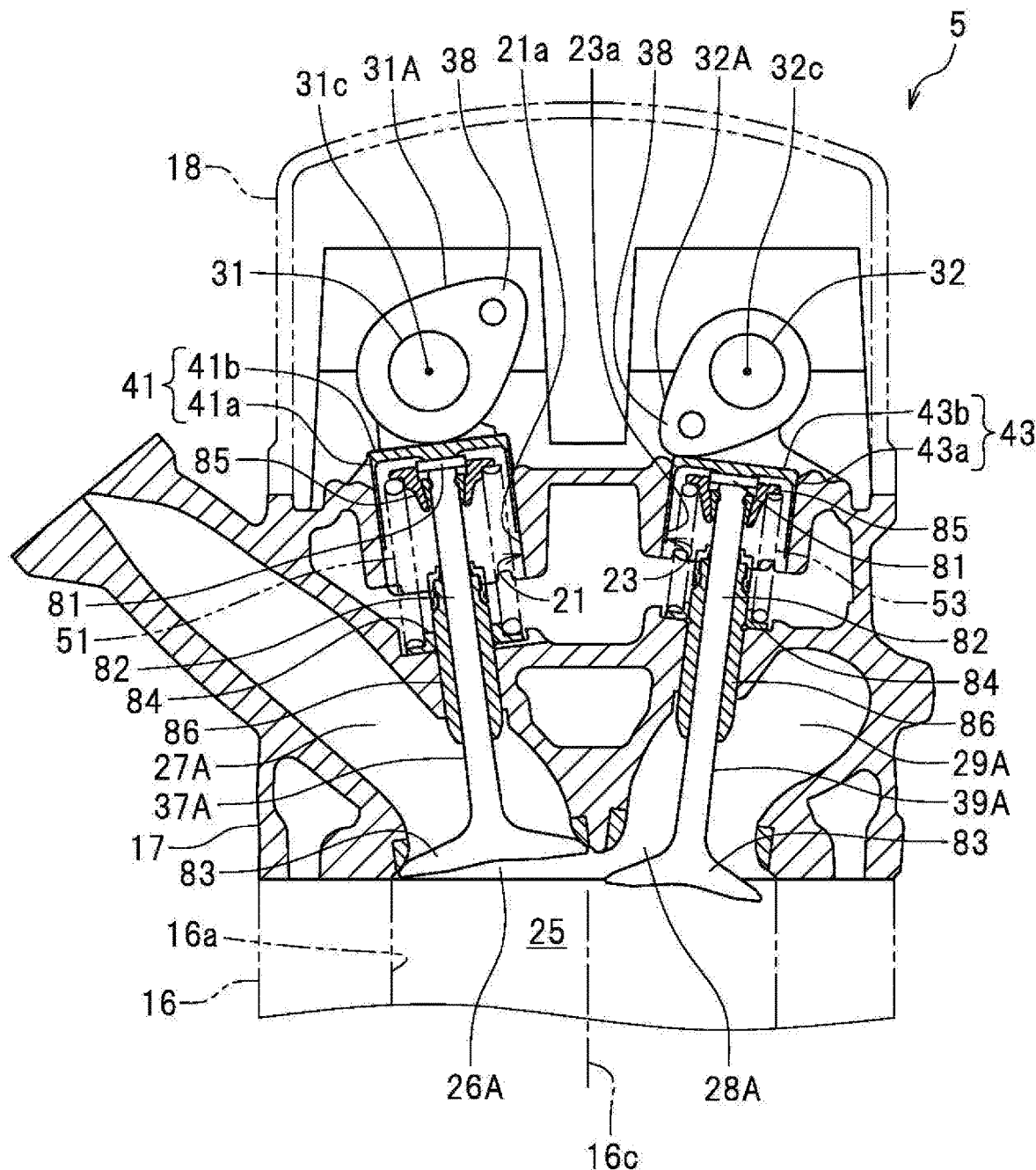
FIG. 2 is a cross-sectional view of a part of an internal combustion engine, taken along line II-II of FIG. 4.
Figure 3:
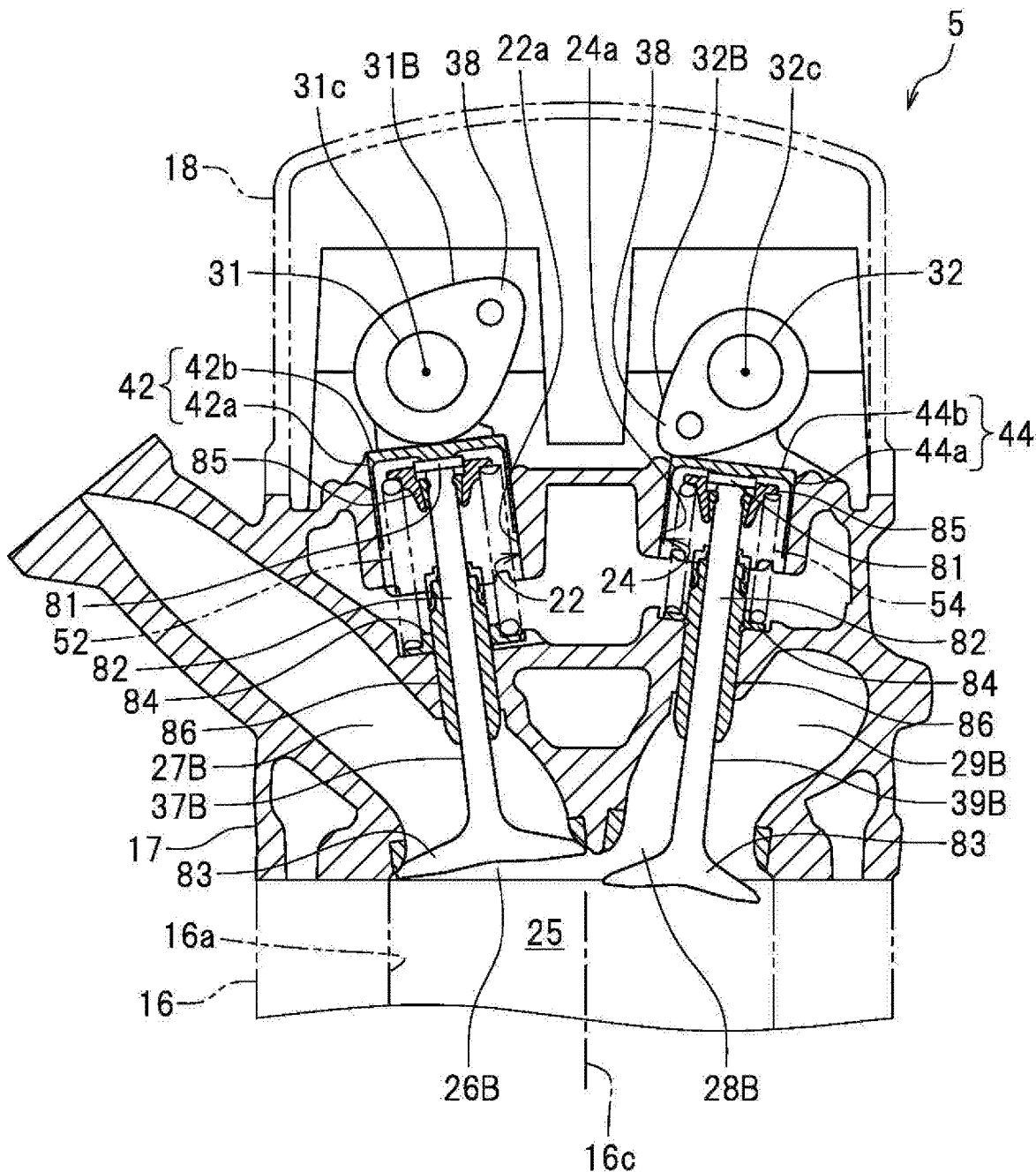
FIG. 3 is a cross-sectional view of a part of an internal combustion engine, taken along line of FIG. 4.
Figure 4:
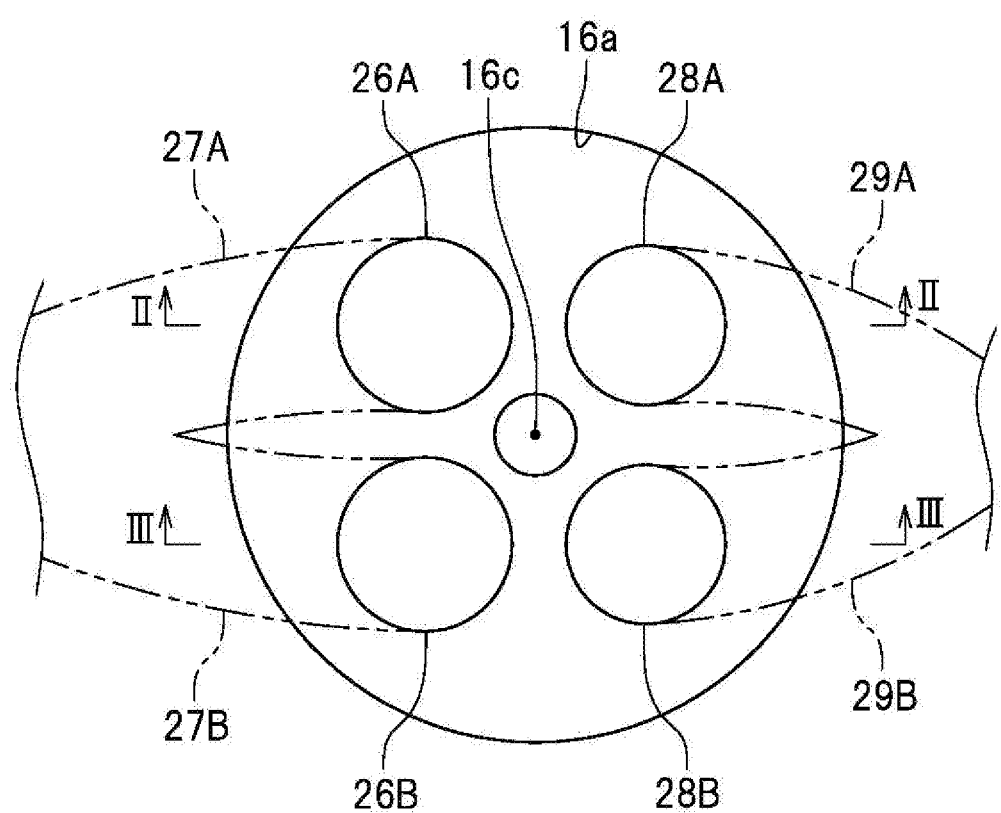
FIG. 4 is a plan view schematically showing a part of an internal combustion engine as viewed along the cylinder axial line.

FIG. 2 is a cross-sectional view of a part of the engine 5. FIG. 3 is a cross-sectional view of another part of the engine 5. FIG. 4 is a plan view schematically showing a part of the engine 5 as viewed along the axial line (hereinafter referred to as a cylinder axial line) 16c of the cylinder 16a. Note that FIG. 2 and FIG. 3 are cross-sectional views taken along line II-II and line respectively, of FIG. 4.

As shown in FIG. 2, the cylinder head 17 includes a first intake port 27A having a first intake opening 26A that is facing toward a combustion chamber 25, and a first exhaust port 29A having a first exhaust opening 28A that is facing toward the combustion chamber 25. As shown in FIG. 3, the cylinder head 17 further includes a second intake port 27B having a second intake opening 26B that is facing toward the combustion chamber 25, and a second exhaust port 29B having a second exhaust opening 28B that is facing toward the combustion chamber 25.

As shown in FIG. 2 and FIG. 3, the engine 5 includes a first intake valve 37A that opens/closes the first intake opening 26A, a second intake valve 37B that opens/closes the second intake opening 26B, a first exhaust valve 39A that opens/closes the first exhaust opening 28A, and a second exhaust valve 39B that opens/closes the second exhaust opening 28B. The engine 5 includes a first camshaft 31 having a first intake cam 31A and a second intake cam 31B, and a second camshaft 32 having a first exhaust cam 32A and a second exhaust cam 32B. The first camshaft 31 and the second camshaft 32 are rotatably supported on the cylinder head 17. The first camshaft 31 and the second camshaft 32 are arranged in parallel to each other.

As shown in FIG. 2, the cylinder head 17 includes a first valve lifter hole 21 having an inner circumferential surface 21a. The first valve lifter 41 is inserted in the first valve lifter hole 21. In the first valve lifter hole 21, the first valve lifter 41 can reciprocate toward and away from a center line 31c of the first camshaft 31. The term "upward" as used herein for a valve lifter refers to the direction toward the axis of the camshaft of the cam in contact with the valve lifter, and the term "downward" refers to the direction away from the axis of the camshaft. For example, for the first valve lifter 41, the direction in which the first valve lifter 41 moves toward the center line 31c of the first camshaft 31 is referred to as "upward", and the direction in which the first valve lifter 41 moves away from the center line 31c of the first camshaft 31 is referred to as "downward". This similarly applies to other valve lifters 42 to 44 to be discussed later. The first valve lifter 41 reciprocates between a predetermined lower position and a predetermined upper position. The first valve lifter 41 includes an outer circumferential surface 41a in contact with the inner circumferential surface 21a of the first valve lifter hole 21, and an upper surface 41b in contact with the first intake cam 31A.

The first intake valve 37A is a so-called poppet valve. The first intake valve 37A includes a valve stem end 81, a valve stem 82 extending in a straight line from the valve stem end 81, and a valve body 83 provided at the tip portion of the valve stem 82. A cylindrical valve guide 86 is supported on the cylinder head 17. The valve stem 82 extends through the valve guide 86 and is slidably supported on the valve guide 86. The first intake valve 37A ascends and descends as the valve stem 82 slides against the valve guide 86.

A valve spring seat 84 is supported on the cylinder head 17. A valve spring seat 85 is supported on the valve stem end 81. A first valve spring 51 is arranged between the valve spring seat 84 and the valve spring seat 85. One end portion of the first valve spring 51 is supported on the valve spring seat 85, and the other end portion thereof is supported on the valve spring seat 84. The valve stem end 81 is in contact with the first valve lifter 41. The first valve spring 51 biases the valve lifter 41 toward the first intake cam 31A via the valve spring seat 85 and the first intake valve 37A.

As shown in FIG. 2 and FIG. 3, the cylinder head 17 includes a second valve lifter hole 22 having an inner circumferential surface 22a, a third valve lifter hole 23 having an inner circumferential surface 23a, and a fourth valve lifter hole 24 having an inner circumferential surface 24a. A second valve lifter 42 is inserted in the second valve lifter hole 22, a third valve lifter 43 is inserted in the third valve lifter hole 23, and a fourth valve lifter 44 is inserted in the fourth valve lifter hole 24. The second to fourth valve lifters 42 to 44 can reciprocate up and down in the second to fourth valve lifter holes 22 to 24, respectively. The second to fourth valve lifters 42 to 44 each reciprocate between its predetermined lower position and its predetermined upper position. The second to fourth valve lifters 42 to 44 are configured as is the first valve lifter 41. The second valve lifter 42 includes an outer circumferential surface 42a in contact with the inner circumferential surface 22a of the second valve lifter hole 22, and an upper surface 42b in contact with the second intake cam 31B. The third valve lifter 43 includes an outer circumferential surface 43a in contact with the inner circumferential surface 23a of the third valve lifter hole 23, and an upper surface 43b in contact with the first exhaust cam 32A. The fourth valve lifter 44 includes an outer circumferential surface 44a in contact with the inner circumferential surface 24a of the fourth valve lifter hole 24, and an upper surface 44b in contact with the second exhaust cam 32B.

The second intake valve 37B, the first exhaust valve 39A and the second exhaust valve 39B are configured as is the first intake valve 37A. The second intake valve 37B, the first exhaust valve 39A and the second exhaust valve 39B are supported on the cylinder head 17, as is the first intake valve 37A. Thus, like elements to those already described above are denoted by like reference signs and will not be further described below.

A second valve spring 52 is provided between the second valve lifter 42 and the cylinder head 17. The second valve spring 52 biases the second valve lifter 42 toward the second intake cam 31B. A third valve spring 53 is provided between the third valve lifter 43 and the cylinder head 17. The third valve spring 53 biases the third valve lifter 43 toward the first exhaust cam 32A. A fourth valve spring 54 is provided between the fourth valve lifter 44 and the cylinder head 17. The fourth valve spring 54 biases the fourth valve lifter 44 toward the second exhaust cam 32B.

The first intake cam 31A rotates following the rotation of the first camshaft 31. When a cam nose 38 of the first intake cam 31A pushes the first valve lifter 41 downward, the first valve lifter 41 and the first intake valve 37A move downward, thereby opening the first intake opening 26A. When the first intake cam 31A further rotates and the cam nose 38 comes off the first valve lifter 41, the first intake valve 37A and the first valve lifter 41 ascend due to the urging of the first valve spring 51, thereby closing the first intake opening 26A. The first intake cam 31A, the first valve lifter 41, the first intake valve 37A and the first valve spring 51 cyclically repeats such an operation. Thus, the first intake opening 26A is cyclically opened/closed. In this operation, the outer circumferential surface 41a of the first valve lifter 41 slides against the inner circumferential surface 21a of the first valve lifter hole 21. The upper surface 41b of the first valve lifter 41 slides against the first intake cam 31A. Therefore, in order to prevent the wear of the outer circumferential surface 41a and the upper surface 41b of the first valve lifter 41, there is a need to supply lubricant oil to the outer circumferential surface 41a and the upper surface 41b.

Similarly, the second valve lifter 42, the third valve lifter 43 and the fourth valve lifter 44 reciprocate following the rotation of the second intake cam 31B, the first exhaust cam 32A and the second exhaust cam 32B, respectively, thereby cyclically opening/closing the second intake valve 37B, the first exhaust valve 39A and the second exhaust valve 39B, respectively. The outer circumferential surface 42a of the second valve lifter 42 slides against the inner circumferential surface 22a of the second valve lifter hole 22, and the upper surface 42b thereof slides against the second intake cam 31B. The outer circumferential surface 43a the third valve lifter 43 slides against the inner circumferential surface 23a of the third valve lifter hole 23, and the upper surface 43b thereof slides against the first exhaust cam 32A. The outer circumferential surface 44a of the fourth valve lifter 44 slides against the inner circumferential surface 24a of the fourth valve lifter hole 24, and the upper surface 44b thereof slides against the second exhaust cam 32B. Therefore, there is a need to supply lubricant oil also to the outer circumferential surface 42a and the upper surface 42b of the second valve lifter 42, the outer circumferential surface 43a and the upper surface 43b of the third valve lifter 43, and the outer circumferential surface 44a and the upper surface 44b of the fourth valve lifter 44.

In view of this, the cylinder head 17 of the engine 5 includes an oil supply passage 70 to be described below. Next, the configuration of the oil supply passage 70 will be described.

Figure 5:
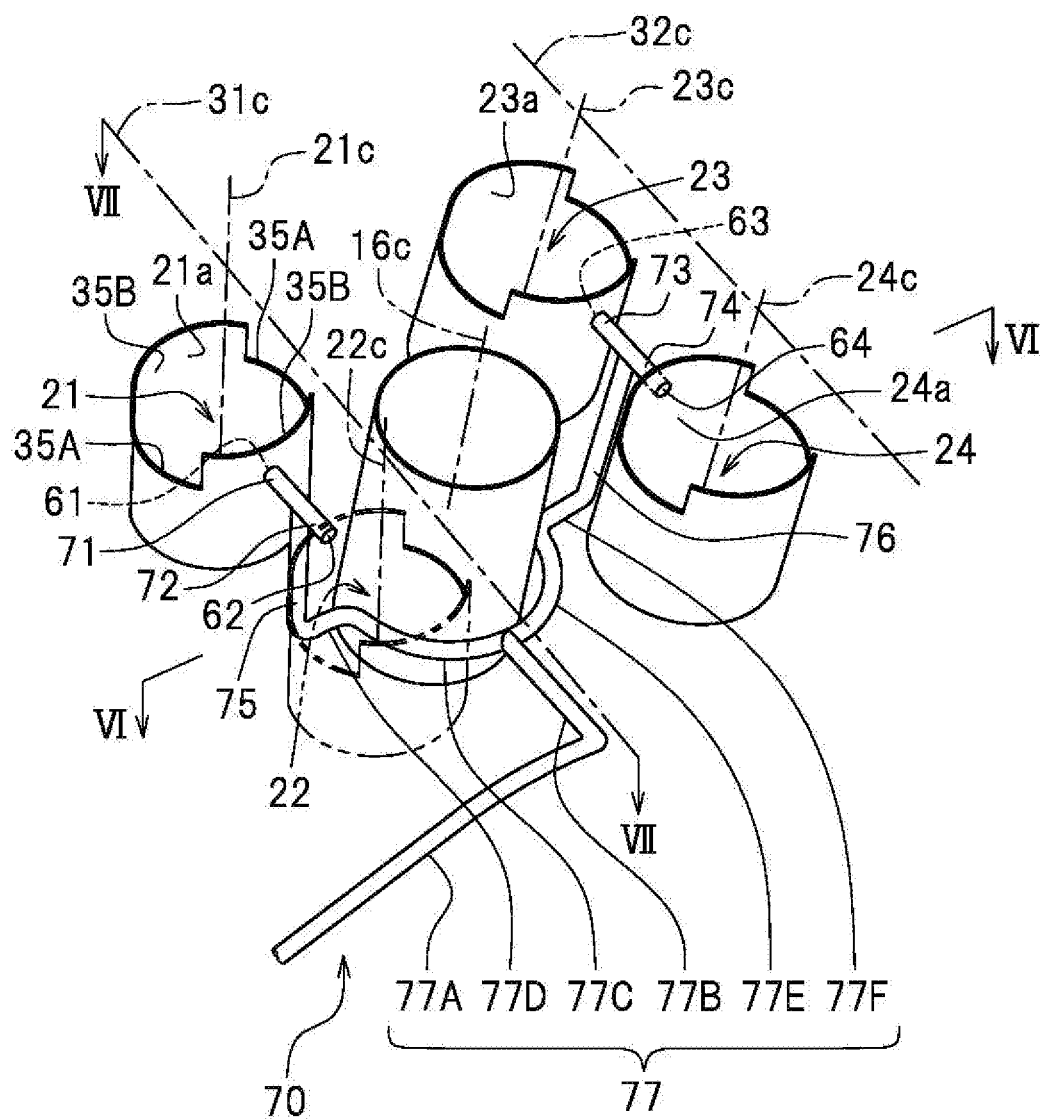
FIG. 5 is a perspective view showing a configuration of an oil supply passage.
Figure 6:
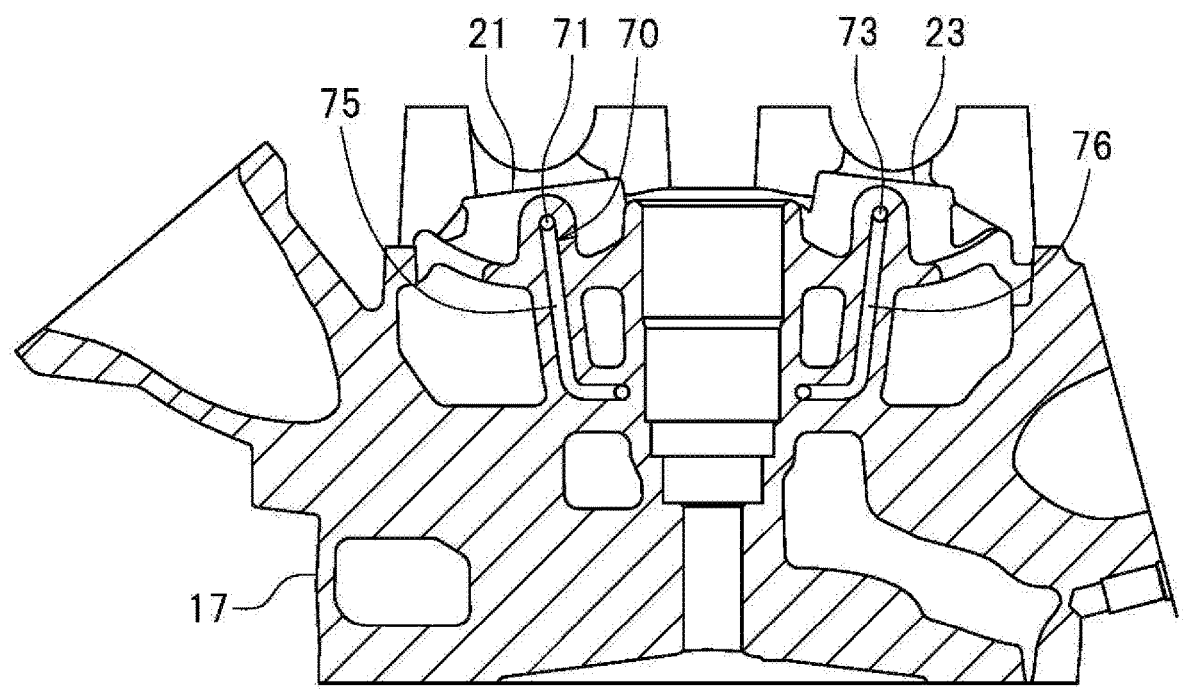
FIG. 6 is a cross-sectional view of a part of an internal combustion engine, taken along line VI-VI of FIG. 5.

FIG. 5 shows the configuration of the oil supply passage 70. Although the oil supply passage 70 is actually a passage formed inside the cylinder head 17 (see FIG. 6), the oil supply passage 70 is shown as being a pipe in FIG. 5 for easier understanding of the configuration. Although the first to fourth valve lifter holes 21 to 24 are actually holes formed in the cylinder head 17, they are shown as being cylinders in FIG. 5. As shown in FIG. 5, the oil supply passage 70 includes an upstream passage 77, a first vertical passage 75, a second vertical passage 76, a first passage 71, a second passage 72, a third passage 73, and a fourth passage 74.

The upstream passage 77 is a passage for carrying lubricant oil sent from an oil pump (not shown). The upstream passage 77 is formed downward relative to the center line 31c of the first camshaft 31 and a center line 32c of the second camshaft 32. The upstream passage 77 is formed in a portion of the cylinder head 17 that is closer to the cylinder 16a with respect to the center line 31c of the first camshaft 31 and the center line 32c of the second camshaft 32. Although there is no limitation on the configuration of the upstream passage 77, the upstream passage 77 herein includes first to seventh upstream passages 77A to 77F. As viewed along a cylinder axial line 16c, the first upstream passage 77A extends perpendicular to the center line 31c of the first camshaft 31 and the center line 32c of the second camshaft 32. The second upstream passage 77B extends from the first upstream passage 77A toward the cylinder axial line 16c. The second upstream passage 77B is formed between the second valve lifter hole 22 and the fourth valve lifter hole 24. The second upstream passage 77B is parallel to the center line 31c of the first camshaft 31 and the center line 32c of the second camshaft 32. The third upstream passage 77C and the fifth upstream passage 77E branch off the second upstream passage 77B. The third upstream passage 77C and the fifth upstream passage 77E are each formed in a quarter circle arc centered at the cylinder axial line 16c. The third upstream passage 77C extends from the second upstream passage 77B toward the first valve lifter hole 21 and the second valve lifter hole 22. As viewed along the cylinder axial line 16c, the fourth upstream passage 77D extends from the third upstream passage 77C toward the middle point between the first valve lifter hole 21 and the second valve lifter hole 22. The fifth upstream passage 77E extends from the second upstream passage 77B toward the third valve lifter hole 23 and the fourth valve lifter hole 24. As viewed from the cylinder axial line 16c, the sixth upstream passage 77F extends from the fifth upstream passage 77E toward the middle point between the third valve lifter hole 23 and the fourth valve lifter hole 24. As viewed along the cylinder axial line 16c, the fourth upstream passage 77D and the sixth upstream passage 77F are perpendicular to the center line 31c of the first camshaft 31 and the center line 32c of the second camshaft 32.

The first vertical passage 75 extends upward from the fourth upstream passage 77D. The first vertical passage 75 extends from the fourth upstream passage 77D toward the center line 31c of the first camshaft 31. The first vertical passage 75 is parallel to the first valve lifter hole 21 and the second valve lifter hole 22. The first vertical passage 75 extends straight. The second vertical passage 76 extends upward from the sixth upstream passage 77F. The second vertical passage 76 extends from the sixth upstream passage 77F toward the center line 32c of the second camshaft 32. The second vertical passage 76 is parallel to the third valve lifter hole 23 and the fourth valve lifter hole 24. The second vertical passage 76 extends straight.

The first passage 71 and the second passage 72 branch off the first vertical passage 75. The first passage 71 extends from the first vertical passage 75 toward a center line 21c of the first valve lifter hole 21. The second passage 72 extends from the first vertical passage 75 toward a center line 22c of the second valve lifter hole 22. The third passage 73 and the fourth passage 74 branch off the second vertical passage 76. The third passage 73 extends from the second vertical passage 76 toward a center line 23c of the third valve lifter hole 23. The fourth passage 74 extends from the second vertical passage 76 toward a center line 24c of the fourth valve lifter hole 24. The first passage 71 and the second passage 72 are parallel to the center line 31c of the first camshaft. The third passage 73 and the fourth passage 74 are parallel to the center line 32c of the second camshaft 32. The first to fourth passages 71 to 74 each extend straight.

A first oil supply port 61 is formed on the inner circumferential surface 21a of the first valve lifter hole 21. A second oil supply port 62 is formed on the inner circumferential surface 22a of the second valve lifter hole 22. A third oil supply port 63 is formed on the inner circumferential surface 23a of the third valve lifter hole 23. A fourth oil supply port 64 is formed on the inner circumferential surface 24a of the fourth valve lifter hole 24. The first oil supply port 61 is connected to the first passage 71. The second oil supply port 62 is connected to the second passage 72. The third oil supply port 63 is connected to the third passage 73. The fourth oil supply port 64 is connected to the fourth passage 74.

Figure 7:
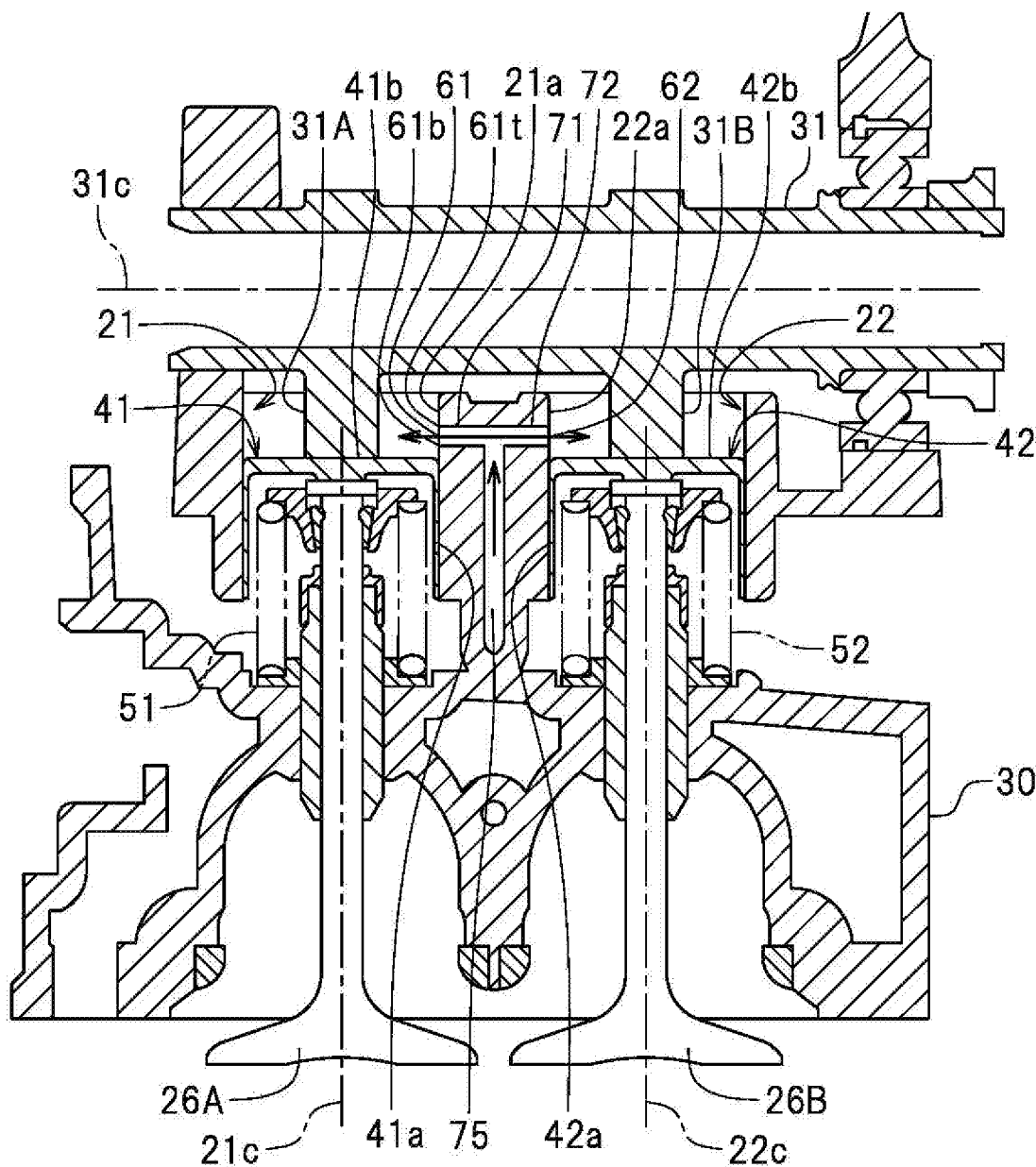
FIG. 7 is a cross-sectional view of a part of an internal combustion engine where the first valve lifter and the second valve lifter are in their lower positions, taken along line VII-VII of FIG. 5.
Figure 8:
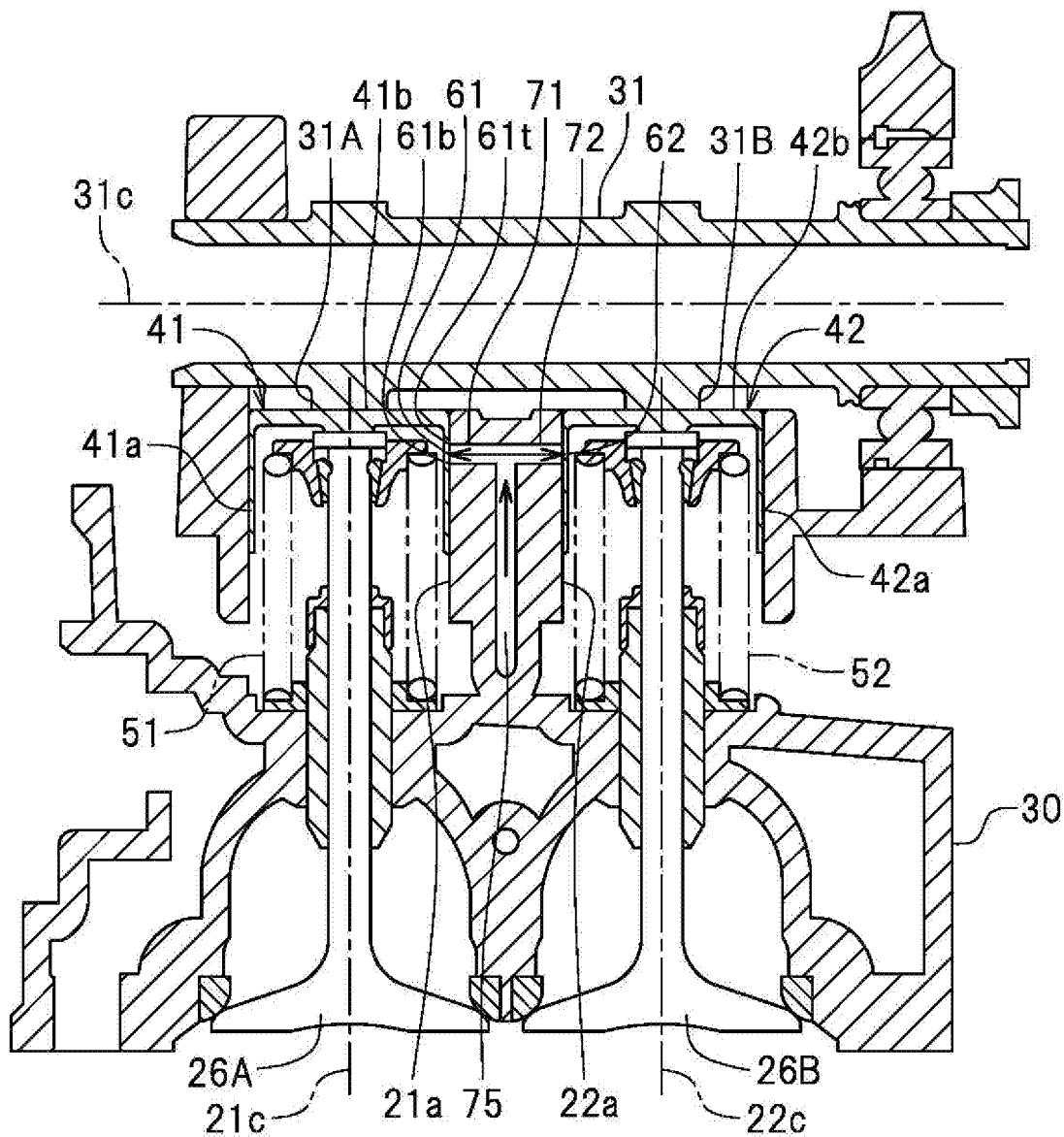
FIG. 8 is a cross-sectional view of a part of an internal combustion engine where the first valve lifter and the second valve lifter are in their upper positions, taken along line VII-VII of FIG. 5.

FIG. 7 and FIG. 8 are vertical cross-sectional views of the cylinder head 17, taken along line VII-VII of FIG. 5. FIG. 7 shows a state where the first valve lifter 41 and the second valve lifter 42 are at their lower positions, and FIG. 8 shows a state where the first valve lifter 41 and the second valve lifter 42 are at their upper positions. As described above, the first valve lifter 41 and the second valve lifter 42 each repeatedly reciprocate between the upper position and the lower position. The upper positions are positions reached by the first valve lifter 41 and the second valve lifter 42 having fully ascended. The lower positions are positions reached by the first valve lifter 41 and the second valve lifter 42 having fully descended.

As shown in FIG. 7, an upper end 61t of the first oil supply port 61 is located upward relative to the upper surface 41b of the first valve lifter 41 being in the lower position. When the first valve lifter 41 is in the lower position, the first oil supply port 61 at least partially does not face the outer circumferential surface 41a of the first valve lifter 41. In the description below, the state where an oil supply port does not face the outer circumferential surface of a valve lifter will be described as "the oil supply port is exposed". When the first valve lifter 41 is in the lower position, the first oil supply port 61 is at least partially exposed. Similarly, the upper end of the second oil supply port 62 is located upward relative to the upper surface 42b of the second valve lifter 42 being in the lower position. When the second valve lifter 42 reciprocates, the second oil supply port 62 is at least partially exposed. Although not shown in the figures, the upper end of the third oil supply port 63 is located upward relative to the upper surface 43b of the third valve lifter 43 being in the lower position. The upper end of the fourth oil supply port 64 is located upward relative to the upper surface 44b of the fourth valve lifter 44 being in the lower position. When the third valve lifter 43 and the fourth valve lifter 44 reciprocate, the third oil supply port 63 and the fourth oil supply port 64 are at least partially exposed.

In the present embodiment, a lower end 61*b* of the first oil supply port 61 is located upward relative to the upper surface 41*b* of the first valve lifter 41 being in the lower position. Therefore, when the first valve lifter 41 reciprocates, the first oil supply port 61 is temporarily entirely exposed. Similarly, the lower end of the second oil supply port 62 is located upward relative to the upper surface 42*b* of the second valve lifter 42 being in the lower position. The lower end of the third oil supply port 63 is located upward relative to the upper surface 43*b* of the third valve lifter 43 being in the lower position. The lower end of the fourth oil supply port 64 is located upward relative to the upper surface 44*b* of the fourth valve lifter 44 being in the lower position. Therefore, when the second to fourth valve lifters 42 to 44 reciprocate, the second to fourth oil supply ports 62 to 64 are temporarily entirely exposed.

As shown in FIG. 8, the lower end 61*b* of the first oil supply port 61 is located downward relative to the upper surface 41*b* of the first valve lifter 41 being in the upper position. When the first valve lifter 41 is in the upper position, the first oil supply port 61 at least partially faces the outer circumferential surface 41*a* of the first valve lifter 41. In the description below, the state where an oil supply port faces the outer circumferential surface of a valve lifter will be described as "the oil supply port is covered". When the first valve lifter 41 is in the upper position, the first oil supply port 61 is at least partially covered. Similarly, the lower end of the second oil supply port 62 is located downward relative to the upper surface 42*b* of the second valve lifter 42 being in the upper position. The lower end of the third oil supply port 63 is located downward relative to the upper surface 43*b* of the third valve lifter 43 being in the upper position. The lower end of the fourth oil supply port 64 is located downward relative to the upper surface 44*b* of the fourth valve lifter 44 being in the upper position. When the second to fourth valve lifters 42 to 44 reciprocate, the second to fourth oil supply ports 62 to 64 are at least partially covered.

In the present embodiment, the upper end 61*t* of the first oil supply port 61 is located downward relative to the upper surface 41*b* of the first valve lifter 41 being in the upper position. When the first valve lifter 41 is in the upper position, the first oil supply port 61 is entirely covered. When the first valve lifter 41 reciprocates, the first oil supply port 61 is temporarily entirely covered. Similarly, the upper end of the second oil supply port 62 is located downward relative to the upper surface 42*b* of the second valve lifter 42 being in the upper position. The upper end of the third oil supply port 63 is located downward relative to the upper surface 43*b* of the third valve lifter 43 being in the upper position. The upper end of the fourth oil supply port 64 is located downward relative to the upper surface 44*b* of the fourth valve lifter 44 being in the upper position. Therefore, when the second to fourth valve lifters 42 to 44 reciprocate, the second to fourth oil supply ports 62 to 64 are temporarily entirely covered.

The oil supply passage 70 is filled with lubricant oil. As shown in FIG. 7, as the first valve lifter 41 descends, the first oil supply port 61 is exposed, thereby directly supplying lubricant oil from the first oil supply port 61 to the upper surface 41*b* of the first valve lifter 41. As the second valve lifter 42 descends, the second oil supply port 62 is exposed, thereby directly supplying lubricant oil from the second oil supply port 62 to the upper surface 42*b* of the second valve lifter 42. As shown in FIG. 8, as the first valve lifter 41 ascends, the first oil supply port 61 is covered, thereby directly supplying lubricant oil from the first oil supply port 61 to the outer circumferential surface 41*a* of the first valve lifter 41. As the second valve lifter 42 ascends, the second oil supply port 62 is covered, thereby directly supplying lubricant oil from the second oil supply port 62 to the outer circumferential surface 42*a* of the second valve lifter 42. The first valve lifter 41 and the second valve lifter 42 repeatedly move up and down. Thus, lubricant oil is cyclically supplied directly to the upper surface 41*b* and the outer circumferential surface 41*a* of the first valve lifter 41 and to the upper surface 42*b* and the outer circumferential surface 42*a* of the second valve lifter 42.

Although not shown in the figures, this similarly applies also to the third valve lifter 43 and the fourth valve lifter 44. That is, as the third valve lifter 43 and the fourth valve lifter 44 descend, lubricant oil is directly supplied from the third oil supply port 63 to the upper surface 43*b* of the third valve lifter 43, and lubricant oil is directly supplied from the fourth oil supply port 64 to the upper surface 44*b* of the fourth valve lifter 44. As the third valve lifter 43 and the fourth valve lifter 44 ascend, lubricant oil is directly supplied from the third oil supply port 63 to the outer circumferential surface 43*a* the third valve lifter 43, and lubricant oil is directly supplied from the fourth oil supply port 64 to the outer circumferential surface 44*a* of the fourth valve lifter 44. Lubricant oil is cyclically supplied directly also to the upper surface 43*b* and the outer circumferential surface 43*a* of the third valve lifter 43 and to the upper surface 44*b* and the outer circumferential surface 44*a* of the fourth valve lifter 44.

The amount of time the first oil supply port 61 is exposed is dictated by the position in the direction along the center line 21*c* of the first valve lifter hole 21 of the first oil supply port 61. By adjusting the position of the first oil supply port 61, it is possible to adjust the amount of time the first oil supply port 61 is exposed. Thus, it is possible to adjust the balance between the amount of lubricant oil directly supplied to the upper surface 41*b* of the first valve lifter 41 and the amount of lubricant oil directly supplied the outer circumferential surface 41*a*. Similarly, by adjusting the positions of the second to fourth oil supply ports 62 to 64, it is possible to adjust the amount of time the second to fourth oil supply ports 62 to 64 are exposed, and it is possible to adjust the balance between the amount of lubricant oil directly supplied to the upper surfaces 42*b* to 44*b* of the second to fourth valve lifters 42 to 44 and the amount of lubricant oil directly supplied to the outer circumferential surfaces 42*a* to 44*a*.

Figure 9:
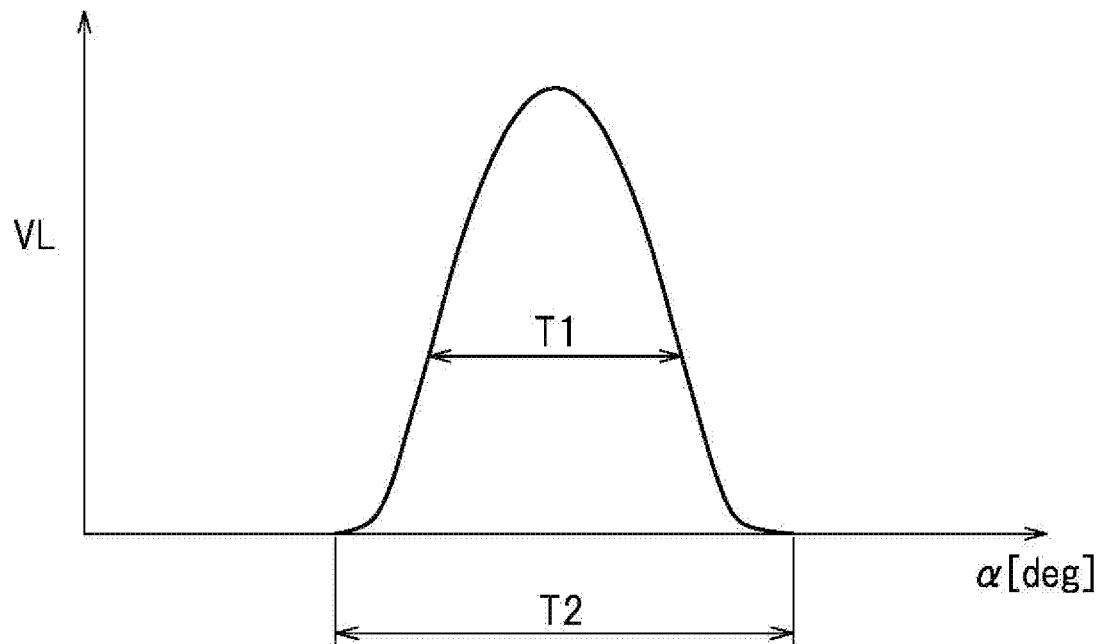
FIG. 9 shows the lift characteristics of the first valve lifter.

The amount of time the first oil supply port 61 is exposed is determined by the rotation angle range of the first camshaft 31 over which the first oil supply port 61 is exposed. Although there is no particular limitation on the amount of time the first oil supply port 61 is exposed, as shown in FIG. 9, the rotation angle range T1 of the first camshaft 31 over which the upper surface 41*b* of the first valve lifter 41 is located downward relative to the upper end 61*t* of the first oil supply port 61 is preferably 50% or more and less than 100% with respect to the rotation angle range T2 of the first camshaft 31 from when the first valve lifter 41 starts moving from the upper position until it returns to the upper position. In FIG. 9, the horizontal axis represents the rotation angle α of the first camshaft 31, and the vertical axis represents the lift amount VL of the first valve lifter 41. Note that T1 is the rotation angle range over which the first oil supply port 61 is at least partially exposed. T2 is the rotation angle range over which the cam nose 38 of the first intake cam 31A (see FIG. 2) is pushing the first valve lifter 41. In the present embodiment, T2 is 170 degrees. In this case, T1 is preferably 85 degrees or more and less than 170 degrees. Note however that there is no particular limitation. T1 and T2 shown in FIG. 9 are merely illustrative. T1 and T2 can be set appropriately. This similarly applies also to the amounts of time the second to fourth oil supply ports 62 to 64 are exposed, which will therefore not be further described below.

Figure 10:
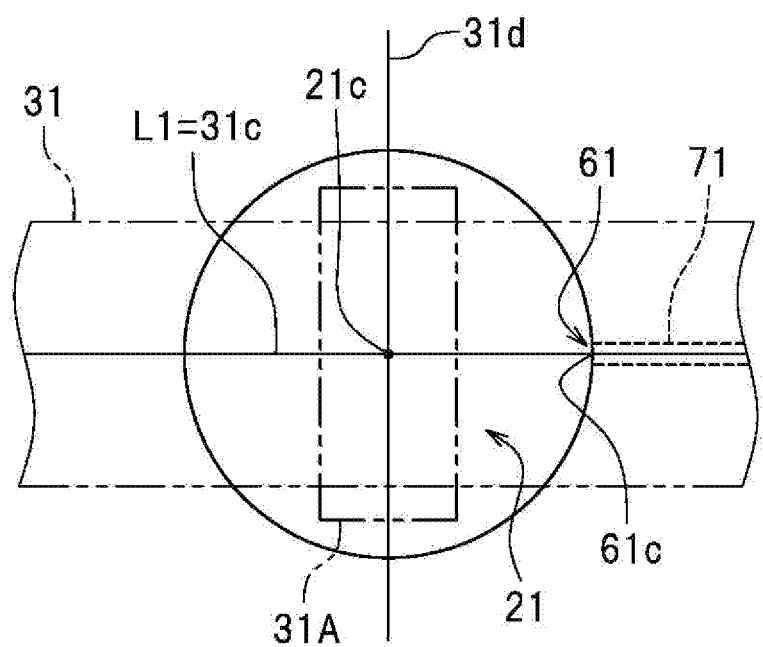
FIG. 10 shows the position of the first oil supply port as viewed along the center line of the first valve lifter hole.

As shown in FIG. 7, when the first oil supply port 61 is exposed, lubricant oil is sprayed from the first oil supply port 61 toward the first intake cam 31A. If the first intake cam 31A were in the vicinity of the first oil supply port 61, lubricant oil would be hindered by the first intake cam 31A and unlikely to be evenly supplied across the entire upper surface 41b of the first valve lifter 41. FIG. 10 shows the position of the first oil supply port 61 as viewed along the center line 21c of the first valve lifter hole 21. In the present embodiment, in FIG. 10, a straight line L1 that connects together the center 21c of the first valve lifter hole 21 and a center 61c of the first oil supply port 61 coincides with the center line 31c of the first camshaft 31. The first oil supply port 61 is provided at a position that is relatively far away from the first intake cam 31A. Therefore, lubricant oil supplied from the first oil supply port 61 is unlikely to be spattered by the first intake cam 31A (see FIG. 7). Lubricant oil supplied from the first oil supply port 61 is unlikely to be hindered by the first intake cam 31A and is likely to be evenly supplied across the entire upper surface 41b of the first valve lifter 41. Therefore, it is possible to more stably supply lubricant oil from the first oil supply port 61 to the upper surface 41b of the first valve lifter 41.

As shown in FIG. 5, a depression 35A that is depressed downward is formed along a peripheral portion of the first valve lifter hole 21 of the cylinder head 17. The depression 35A is formed downward of the first intake cam 31A. Specifically, the depression 35A is formed directly under the first intake cam 31A. With the depression 35A, the rotating first intake cam 31A does not hit the peripheral portion of the first valve lifter hole 21. Conversely, a portion 35B, other than the depression 35A, of the peripheral portion of the first valve lifter hole 21 is extended upward relative to the depression 35A. The upper end of the portion 35B is located upward relative to the lower end of the rotation path of the first intake cam 31A (the lower end of the first intake cam 31A of FIG. 7). With the provision of the portion 35B, which is extended upward, the area of the inner circumferential surface 21a of the first valve lifter hole 21 is relatively large.

Figure 11:
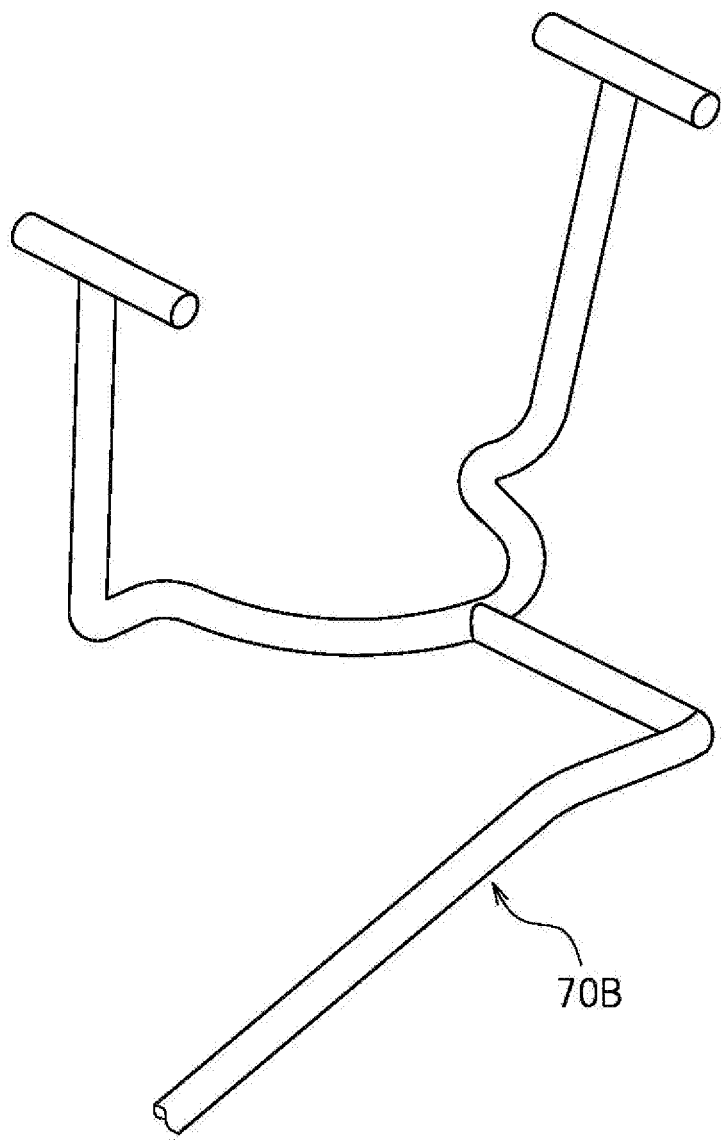
FIG. 11 is a perspective view of a core manufactured by a three-dimensional modeling device.

The motorcycle 1 and the engine 5 are configured as described above. As described above, the cylinder head 17 of the engine 5 includes the oil supply passage 70. Although there is no particular limitation on the machining method for the oil supply passage 70, it is only possible to form a hole of a straight line shape with a drilling process in which a hole is made by using a drill. When forming a passage that is bent in the cylinder head 17, for example, there is a need to form two straight line-shaped holes that cross each other, and then plug a part of a hole. In view of this, in the present embodiment, the cylinder head 17 is manufactured as follows. First, as shown in FIG. 11, a core 70B having the same shape as the oil supply passage 70 is produced by using a three-dimensional modeling device (not shown). Then, the cylinder head 17 is cast with the core 70B fitted in the cast. Thus, it is possible to obtain the cylinder head 17 in which the oil supply passage 70 is precisely formed.

The drilling process needs to be a precise process in order to ensure a sufficient circularity of the valve lifter holes 21 to 24. In view of this, a core that includes the core 70B having the same shape as the oil supply passage 70 and a core having the same shape as the valve lifter holes 21 to 24 may be produced by using a three-dimensional modeling device, and the cylinder head 17 may be cast with this core fitted in the cast. Thus, it is possible to obtain the cylinder head 17 in which the oil supply passage 70 and the valve lifter holes 21 to 24 are precisely formed.

As described above, with the engine 5 according to the present embodiment, lubricant oil is directly supplied to the upper surface 41b of the first valve lifter 41 from the first passage 71 of the oil supply passage 70 through the first oil supply port 61. Now, the upper surface 41b of the first valve lifter 41 is a sliding surface that slides against the first intake cam 31A. According to the present embodiment, it is possible to stably supply lubricant oil to the sliding surface of the first valve lifter 41 that slides against the first intake cam 31A.

As the first valve lifter 41 ascends, the lubricant oil having been supplied to the upper surface 41b of the first valve lifter 41 flows over the periphery of the upper surface 41b down between the outer circumferential surface 41a of the first valve lifter 41 and the inner circumferential surface 21a of the first valve lifter hole 21. Now, the outer circumferential surface 41a of the first valve lifter 41 is a sliding surface that slides against the first valve lifter hole 21. With the engine 5, it is possible to supply lubricant oil to the sliding surface of the first valve lifter 41 that slides against the first valve lifter hole 21 by utilizing the ascension of the first valve lifter 41. In addition, with the engine 5, when the first valve lifter 41 reciprocates between the upper position and the lower position, the first oil supply port 61 faces the outer circumferential surface 41a of the first valve lifter 41. Therefore, lubricant oil is directly supplied to the outer circumferential surface 41a of the first valve lifter 41 from the first passage 71 through the first oil supply port 61. Lubricant oil is directly supplied to the sliding surface of the first valve lifter 41 that slides against the first valve lifter hole 21. Therefore, according to the present embodiment, it is possible to stably supply lubricant oil to the sliding surface of the first valve lifter 41 that slides against the first valve lifter hole 21.

On the other hand, the present embodiment does not require a lubricant oil supply pipe and a reflector wall, which have been used with conventional techniques. Thus, it is possible to prevent the engine 5 from becoming larger.

Therefore, according to the present embodiment, it is possible to stably supply lubricant oil to the sliding surface of the first valve lifter 41 that slides against the first valve lifter hole 21 and the sliding surface thereof that slides against the first intake cam 31A while preventing the engine 5 having a direct-type valve mechanism from becoming larger. Therefore, it is possible to well prevent the wear of the first valve lifter 41, the first valve lifter hole 21 and the first intake cam 31A. It is also possible to sufficiently cool the first valve lifter 41, the first valve lifter hole 21 and the first intake cam 31A.

Similarly, it is possible to stably supply lubricant oil to the sliding surface of the second valve lifter 42 that slides against the second valve lifter hole 22 and the sliding surface thereof that slides against the second intake cam 31B. It is possible to stably supply lubricant oil to the sliding surface of the third valve lifter 43 that slides against the third valve lifter hole 23 and the sliding surface thereof that slides against the first exhaust cam 32A. It is possible to stably supply lubricant oil to the sliding surface of the fourth valve lifter 44 that slides against the fourth valve lifter hole 24 and the sliding surface thereof that slides against the second exhaust cam 32B. Therefore, it is possible to well prevent the wear of the second to fourth valve lifters 42 to 44, the second to fourth valve lifter holes 22 to 24, the second intake cam 31B, the first exhaust cam 32A and the second exhaust cam 32B, and to sufficiently cool these parts.

The motorcycle 1 may take an inclined attitude, e.g., when banking and wheeling, under particular circumstances such as during a motocross race. In that case, the engine 5 also takes an inclined attitude. However, with the engine 5 according to the present embodiment, it is possible to directly supply lubricant oil to the sliding portions of the first to fourth valve lifters 41 to 44, as described above. Therefore, even when the motorcycle 1 takes an inclined attitude, it is possible to sufficiently prevent the wear of the first to fourth valve lifters 41 to 44, etc.

According to the present embodiment, as shown in FIG. 10, the straight line L1 that connects together the center 21c of the first valve lifter hole 21 and the center 61c of the first oil supply port 61 coincides with the center line 31c of the first camshaft 31. The first oil supply port 61 is provided at a position that is far away from the first intake cam 31A. Therefore, it is possible to more stably supply lubricant oil to the upper surface 41b of the first valve lifter 41 through the first oil supply port 61.

Since the first intake cam 31A rotates about the center line 31c of the first camshaft 31, the first valve lifter 41, which receives a force from the first intake cam 31A, is likely to receive a force in a direction that is perpendicular to the center line 31c of the first camshaft 31. The pressure that the inner circumferential surface 21a of the first valve lifter hole 21 of the cylinder head 17 receives from the outer circumferential surface 41a of the first valve lifter 41 is greater in portions thereof that are closer to a line 31d that is perpendicular to the center line 31c of the first camshaft 31. In the present embodiment, the first oil supply port 61 is provided at a position that is far away from the line 31d perpendicular to the center line 31c of the first camshaft 31. Therefore, even though the first oil supply port 61 is formed on the inner circumferential surface 21a of the first valve lifter hole 21, it is possible to maintain a sufficient mechanical strength of the peripheral portion of the first valve lifter hole 21.

Figure 12:
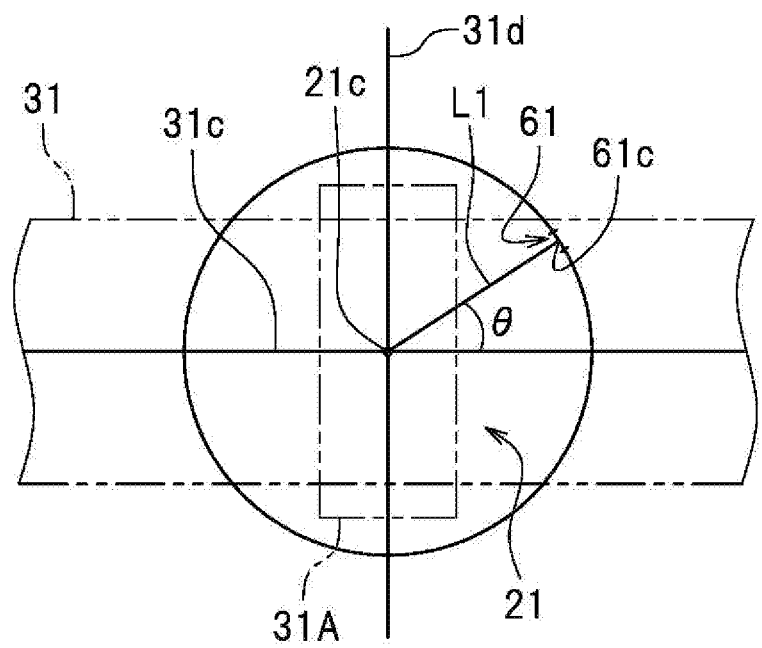
FIG. 12 shows the position of the first oil supply port as viewed along the center line of the first valve lifter hole according to a variation.

Note that the straight line L1 that connects together the center 21c of the first valve lifter hole 21 and the center 61c of the first oil supply port 61 does not need to coincide with, or be co-planar with, the center line 31c of the first camshaft 31. As shown in FIG. 12, θ denotes the angle formed between the straight line L1 and the center line 31c of the first camshaft 31, as seen in a plan view along the center line 21c of the first valve lifter hole 21, θ may be within 10 degrees. Note that "within 10 degrees" as used in the present specification and claims means that it is in the range of −10 degrees or more and +10 degrees or less, where a positive value represents an angle in the counterclockwise direction with respect to the center line 31c of the first camshaft 31. In other words, the line L1 connecting the center 21c of the first valve lifter hole 21 and the center 61c of the first oil supply port 61 may be arranged relative to the center line 31c of the first camshaft 31, as seen in a plan view, in the range from −10 degrees to +10 degrees. Alternatively, the angle θ may be within 45 degrees. That is, it may be −45 degrees or more and +45 degrees or less, where a positive value represents an angle in the counterclockwise direction with respect to the center line 31c of the first camshaft 31.

Similarly, although not shown in the figures, in the present embodiment, as viewed in a plan view along the center line 22c of the second valve lifter hole 22, the straight line that connects together the center 22c of the second valve lifter hole 22 and the center of the second oil supply port 62 coincides with the center line 31c of the first camshaft 31. As viewed in a plan view along the center line 23c of the third valve lifter hole 23, the straight line that connects together the center 23c of the third valve lifter hole 23 and the center of the third oil supply port 63 coincides with the center line 32c of the second camshaft 32. As viewed in a plan view along the center line 24c of the fourth valve lifter hole 24, the straight line that connects together the center 24c of the fourth valve lifter hole 24 and the center of the fourth oil supply port 64 coincides with the center line 32c of the second camshaft 32. Note however that as viewed in a plan view along the center line 22c of the second valve lifter hole 22, the angle formed between the straight line that connects together the center 22c of the second valve lifter hole 22 and the center of the second oil supply port 62 and the center line 31c of the first camshaft 31 may be within 45 degrees. In one embodiment, the angle formed between the straight line that connects together the center 22c of the second valve lifter hole 22 and the center of the second oil supply port 62 and the center line 31c of the first camshaft 31 may be within 10 degrees. As viewed in a plan view along the center line 23c of the third valve lifter hole 23, the angle formed between the straight line that connects together the center 23c of the third valve lifter hole 23 and the center of the third oil supply port 63 and the center line 32c of the second camshaft 32 may be within 45 degrees. In one embodiment, the angle formed between the straight line that connects together the center 23c of the third valve lifter hole 23 and the center of the third oil supply port 63, and the center line 32c of the second camshaft 32 may be within 10 degrees. As viewed in a plan view along the center line 24c of the fourth valve lifter hole 24, the angle formed between the straight line that connects together the center 24c of the fourth valve lifter hole 24 and the center of the fourth oil supply port 64 and the center line 32c of the second camshaft 32 may be within 45 degrees. In one embodiment, the angle formed between the straight line that connects together the center 24c of the fourth valve lifter hole 24 and the center of the fourth oil supply port 64 and the center line 32c of the second camshaft 32 may be within 10 degrees.

According to the present embodiment, as shown in FIG. 9, the rotation angle range T1 of the first camshaft 31 when the upper surface 41b of the first valve lifter 41 is located downward relative to the upper end 61t of the first oil supply port 61 is 50% or more, and less than 100%, with respect to the rotation angle range T2 of the first camshaft 31 from when the first valve lifter 41 starts moving from the upper position until it returns to the upper position. Thus, it is possible to stably supply lubricant oil to the upper surface 41b of the first valve lifter 41, which is the sliding surface that slides against the first intake cam 31A.

According to the present embodiment, as shown in FIG. 7, the first passage 71 of the oil supply passage 70 extends in a direction perpendicular to the center line 21c of the first valve lifter hole 21. The area of the first oil supply port 61 is smaller as compared with a case where the first passage 71 extends in a direction inclined relative to the center line 21c of the first valve lifter hole 21. Therefore, it is possible to ensure a large area of the inner circumferential surface 21a of the first valve lifter hole 21. Thus, it is possible to maintain a sufficient mechanical strength of the peripheral portion of the first valve lifter hole 21 of the cylinder head 17. In the present embodiment, as shown in FIG. 10, the first passage 71 is provided at a position that is far away from the line 31d perpendicular to the center line 31c of the first camshaft 31. This also contributes to maintaining a sufficient mechanical strength of the peripheral portion of the first valve lifter hole 21 of the cylinder head 17.

According to the present embodiment, as shown in FIG. 5, the first passage 71 and the second passage 72 of the oil supply passage 70 branch off a single first vertical passage 75. Therefore, it is possible to shorten the overall length of the oil supply passage 70 as compared with a case where a vertical passage connected to the first passage 71 and a vertical passage connected to the second passage 72 are provided separately from each other. Since it is possible to shorten the length of the oil supply passage 70, it is possible to prevent a pressure decrease of lubricant oil in the first passage 71 and the second passage 72. This also contributes to stably supplying lubricant oil to the sliding surface of the first valve lifter 41 that slides against the first valve lifter hole 21 and the sliding surface thereof that slides against the first intake cam 31A and to the sliding surface of the second valve lifter 42 that slides against the second valve lifter hole 22 and the sliding surface thereof that slides against the second intake cam 31B, while preventing the engine 5 from becoming larger. The first vertical passage 75 is formed between the first valve lifter hole 21 and the second valve lifter hole 22, and extends in a direction perpendicular to the first camshaft 31. This makes it more likely that lubricant oil is evenly supplied to the first oil supply port 61 and the second oil supply port 62.

Similarly, according to the present embodiment, the third passage 73 and the fourth passage 74 of the oil supply passage 70 branch off the second vertical passage 76. It is possible to stably supply lubricant oil to the sliding surface of the third valve lifter 43 that slides against the third valve lifter hole 23 and the sliding surface thereof that slides against the first exhaust cam 32A and to the sliding surface of the fourth valve lifter 44 that slides against the fourth valve lifter hole 24 and the sliding surface thereof that slides against the second exhaust cam 32B.

According to the present embodiment, the depression 35A that is depressed downward is formed along the peripheral portion of the first valve lifter hole 21 of the cylinder head 17 and downward of the first intake cam 31A. Thus, the peripheral portion of the first valve lifter hole 21 can be prevented from interferring with the rotating first intake cam 31A. Since it is possible to ensure a sufficient height of the portion 35B, other than the depression 35A, of the peripheral portion, it is possible to increase the area of the inner circumferential surface 21a of the first valve lifter hole 21. Therefore, it is possible to reduce the pressure that the inner circumferential surface 21a of the first valve lifter hole 21 receives from the outer circumferential surface 41a of the first valve lifter 41, and it is possible to maintain a sufficient mechanical strength of the peripheral portion of the first valve lifter hole 21.

Now, if an excess of lubricant oil remains on the upper surface 41b of the first valve lifter 41, it may possibly increase the resistance against the rotation of the first intake cam 31A. According to the present embodiment, however, even if lubricant oil remains on the upper surface 41b of the first valve lifter 41, any excess of lubricant oil is likely to flow over the upper surface 41b via the depression 35A. Thus, it is possible to reduce the resistance against the rotation of the first intake cam 31A.

In the present embodiment, with the provision of the depression 35A, a portion of the outer circumferential surface 41a of the first valve lifter 41 (specifically, a portion that is adjacent to the depression 35A) does not come into contact with the inner circumferential surface 21a of the first valve lifter hole 21 when the first valve lifter 41 is in the upper position. Lubricant oil is temporarily not supplied to said portion. However, since lubricant oil is directly supplied to the sliding surface of the first valve lifter 41 that slides against the first valve lifter hole 21 (i.e., the outer circumferential surface 41a) from the oil supply passage 70, lubricant oil is sufficiently supplied to said portion while the first valve lifter 41 moves from the upper position toward the lower position. When the first valve lifter 41 comes back from the lower position to the upper position, lubricant oil that has remained on the upper surface 41b of the first valve lifter 41 is supplied to the lubricating surface (the outer circumferential surface 41a). Therefore, it is possible to also well lubricate said portion of the outer circumferential surface 41a of the first valve lifter 41 (i.e., a portion that is adjacent to the depression 35A when the first valve lifter 41 is in the upper position). Despite the provision of the depression 35A, it is possible to desirably supply lubricant oil to the sliding surface of the first valve lifter 41 that slides against the first valve lifter hole 21.

Note that this similarly applies also to the peripheral portion of the second valve lifter hole 22, the peripheral portion of the third valve lifter hole 23, and the peripheral portion of the fourth valve lifter hole 24 of the cylinder head 17.

According to the present embodiment, for manufacturing the engine 5, a three-dimensional modeling device is used to produce the core 70B having the same shape as the oil supply passage 70 (see FIG. 11), and the cylinder head 17 is cast with the core 70B fitted in the cast. Therefore, it is possible to form the oil supply passage 70 without performing a drilling process. Even an oil supply passage 70 having a complicated shape can be manufactured with ease and high precision.

One embodiment has been described above. However, the embodiment described above is merely an example. Various other embodiments are possible.

In the embodiment described above, four valve lifters 41 to 44 are provided in the cylinder head 17. However, there is no limitation on the number of valve lifters.

The shape of the oil supply passage 70 of the embodiment described above is merely an example. There is no limitation on the shape of the oil supply passage 70.

In the embodiment described above, the oil supply ports 61 to 64 each have a circular shape. However, the shape is not limited to this. For example, the oil supply ports 61 to 64 may each have an elliptical shape or a quadrangular shape. The oil supply ports 61 to 64 may have the same dimension or different dimensions. The oil supply ports 61 to 64 may have the same upper/lower positions or different upper/lower positions.

In the embodiment described above, the depression 35A is formed along the peripheral portion of each of the first to fourth valve lifter holes 21 to 24. However, the depression 35A may not be necessary. The depression 35A may be absent.

While a straddled vehicle refers to a vehicle to be straddled by a passenger, the straddled vehicle is not limited to a motorcycle. The straddled vehicle may be other vehicles to be straddled by a passenger, e.g., a motortricycle, an ATV (all terrain vehicle), etc.

The terms and expressions used herein are used for explanation purposes and should not be construed as being restrictive. It should be appreciated that the terms and expressions used herein do not eliminate any equivalents of features illustrated and mentioned herein, but include various modifications falling within the claimed scope of the present invention. The present invention may be embodied in many different forms. The present disclosure is to be considered as providing examples of the principles of the invention. These examples are described herein with the understanding that such examples are not intended to limit the present invention to preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

What is claimed is:

1. An internal combustion engine comprising:
   a cylinder head including a first valve lifter hole having an inner circumferential surface;
   a first camshaft having a first cam, the first camshaft rotatably supported on the cylinder head;
   a first valve lifter in the first valve lifter hole and having an outer circumferential surface in contact with the inner circumferential surface of the first valve lifter hole, the first valve lifter having an upper surface in contact with the first cam;
   a first valve spring that biases the first valve lifter toward the first cam so that the first valve lifter reciprocates within the first valve lifter hole, based on rotation of the first cam, between a lower position and an upper position that is closer to the first camshaft than the lower position; and
   an oil supply passage having a first oil supply port formed on the inner circumferential surface of the first valve lifter hole and a first passage connected to the first oil supply port, wherein lubricant oil flows through the oil supply passage, wherein:
      an upper end of the first oil supply port is located upward relative to the upper surface of the first valve lifter when the first valve lifter is in the lower position; and
      a lower end of the first oil supply port is located downward relative to the upper surface of the first valve lifter when the first valve lifter is in the upper position.

2. The internal combustion engine according to claim 1, wherein the lower end of the first oil supply port is located upward relative to the upper surface of first valve lifter when the first valve lifter is in the lower position.

3. The internal combustion engine according to claim 1, wherein as viewed along a center line of the first valve lifter hole, an angle formed between a straight line that connects together a center of the first valve lifter hole and the first oil supply port and a center line of the camshaft is within 45 degrees.

4. The internal combustion engine according to claim 3, wherein the angle is within 10 degrees.

5. The internal combustion engine according to claim 1, wherein as viewed along a center line of the first valve lifter hole, a straight line that connects together a center of the first valve lifter hole and a center of the first oil supply port coincides with a center line of the camshaft.

6. The internal combustion engine according to claim 1, wherein a rotation angle range of the first camshaft when the upper surface of the first valve lifter is located downward relative to the upper end of the first oil supply port is 50% or more and less than 100%, with respect to a rotation angle range of the first camshaft from when the first valve lifter starts moving from the upper position until the first valve lifter returns to the upper position.

7. The internal combustion engine according to claim 1, wherein the first passage of the oil supply passage extends in a direction perpendicular to a center line of the first valve lifter hole.

8. The internal combustion engine according to claim 1, wherein:
   the cylinder head includes a second valve lifter hole having an inner circumferential surface;
   the first camshaft has a second cam;
   the internal combustion engine comprises:
      a second valve lifter in the second valve lifter hole and having an outer circumferential surface in contact with the inner circumferential surface of the second valve lifter hole and an upper surface in contact with the second cam; and
      a second valve spring that biases the second valve lifter toward the second cam so that the second valve lifter reciprocates within the second valve lifter hole, based on rotation of the second cam, between a lower position and an upper position that is closer to the first camshaft than the lower position;
   the oil supply passage has a second oil supply port formed on the inner circumferential surface of the second valve lifter hole and a second passage connected to the second oil supply port;
   as viewed along a center line of the first valve lifter hole, the first passage is arranged on the second valve lifter hole side relative to a center of the first valve lifter hole;
   as viewed along a center line of the second valve lifter hole, the second passage is arranged on the first valve lifter hole side relative to a center of the second valve lifter hole; and
   the oil supply passage includes a first vertical passage that is arranged on the second valve lifter hole side relative to the first valve lifter hole and on the first valve lifter hole side relative to the second valve lifter hole, extends in a direction perpendicular to the first camshaft, and is connected to the first passage and the second passage.

9. The internal combustion engine according to claim 8, wherein:
   the cylinder head includes third and fourth valve lifter holes each having an inner circumferential surface;
   the internal combustion engine comprises:
      a second camshaft having a third cam and a fourth cam and rotatably supported on the cylinder head;
      a third valve lifter in the third valve lifter hole and having an outer circumferential surface in contact with the inner circumferential surface of the third valve lifter hole, the third valve lifter having an upper surface in contact with the third cam;
      a fourth valve lifter in the fourth valve lifter hole and having an outer circumferential surface in contact with the inner circumferential surface of the fourth valve lifter hole, the fourth valve lifter having an upper surface in contact with the fourth cam;
      a third valve spring that biases the third valve lifter toward the third cam so that the third valve lifter reciprocates within the third valve lifter hole, based on rotation of the third cam, between a lower position and an upper position that is closer to the second camshaft than the lower position; and
      a fourth valve spring that biases the fourth valve lifter toward the fourth cam so that the fourth valve lifter reciprocates within the fourth valve lifter hole, based on rotation of the fourth cam, between a lower position and an upper position that is closer to the second camshaft than the lower position;

the oil supply passage includes a third oil supply port formed on the inner circumferential surface of the third valve lifter hole, a third passage connected to the third oil supply port, a fourth oil supply port formed on the inner circumferential surface of the fourth valve lifter hole, and a fourth passage connected to the fourth oil supply port;

as viewed along a center line of the third valve lifter hole, the third passage is arranged on the fourth valve lifter hole side relative to a center of the third valve lifter hole;

as viewed along a center line of the fourth valve lifter hole, the fourth passage is arranged on the third valve lifter hole side relative to a center of the fourth valve lifter hole; and the oil supply passage includes:
  a second vertical passage that is arranged on the fourth valve lifter hole side relative to the third valve lifter hole and on the third valve lifter hole side relative to the fourth valve lifter hole, extends in a direction perpendicular to the second camshaft, and is connected to the third passage and the fourth passage; and
  an upstream passage that communicates with the first vertical passage and the second vertical passage.

10. The internal combustion engine according to claim 1, wherein the cylinder head includes a depression formed along a peripheral portion of the first valve lifter hole of the cylinder head and downward of the first cam.

11. A straddled vehicle comprising the internal combustion engine according to claim 1.

12. A method for manufacturing the internal combustion engine according to claim 1, comprising:
  producing a core having the same shape as the oil supply passage by using a three-dimensional modeling device; and
  casting the cylinder head with the core fitted in a cast.

* * * * *